United States Patent
Kim et al.

(10) Patent No.: US 11,095,838 B2
(45) Date of Patent: Aug. 17, 2021

(54) ELECTRONIC DEVICE AND METHOD FOR CAPTURING IMAGE IN ELECTRONIC DEVICE

(71) Applicant: Samsung Electronics Co., Ltd., Gyeonggi-do (KR)

(72) Inventors: Dong-Soo Kim, Gyeonggi-do (KR); Hwa-Young Kang, Gyeonggi-do (KR); Shuichi Shimokawa, Gyeonggi-do (KR); Young-Kwon Yoon, Seoul (KR); Sang-Min Lee, Gyeonggi-do (KR); Jong-Hun Won, Gyeonggi-do (KR)

(73) Assignee: Samsung Electronics Co., Ltd

( * ) Notice: Subject to any disclaimer, the term of this patent is extended or adjusted under 35 U.S.C. 154(b) by 78 days.

(21) Appl. No.: 15/870,314

(22) Filed: Jan. 12, 2018

(65) Prior Publication Data

US 2018/0213166 A1  Jul. 26, 2018

(30) Foreign Application Priority Data

Jan. 25, 2017 (KR) ........................ 10-2017-0012248

(51) Int. Cl.
*H04N 5/353* (2011.01)
*H04N 5/232* (2006.01)
(Continued)

(52) U.S. Cl.
CPC ....... *H04N 5/3532* (2013.01); *H04N 5/23216* (2013.01); *H04N 5/23232* (2013.01);
(Continued)

(58) Field of Classification Search
CPC ...... G08B 13/196–19697; G06F 3/005; G11B 31/006; G11B 2020/10537–10611;
(Continued)

(56) References Cited

U.S. PATENT DOCUMENTS 7,545,434 B2  6/2009  Bean et al.
9,176,608 B1 *  11/2015  Baldwin ............ G06K 9/00335
(Continued)

FOREIGN PATENT DOCUMENTS

| CN | 102428701 | 4/2012 |
|---|---|---|
| CN | 104618656 | 5/2015 |

(Continued)

OTHER PUBLICATIONS

European Search Report dated Jun. 20, 2018 issued in counterpart application No. 18153442.1-1209, 7 pages.
(Continued)

*Primary Examiner* — Xi Wang
(74) *Attorney, Agent, or Firm* — The Farrell Law Firm, P.C.

(57) ABSTRACT

An electronic device includes an image capturing device and a processor electrically connected with the image capturing device, wherein the processor is configured to obtain a first portion of a video at a first capturing speed during a first period using the image capturing device, control a first notification to indicate obtaining a second portion of the video at a set second capturing speed when the second capturing speed is set as a speed of capturing the video based on a result of analyzing the first obtained portion, and obtain the second portion at the second capturing speed during a second period following the first period using the image capturing device.

15 Claims, 12 Drawing Sheets

(51) Int. Cl.
*H04N 5/235* (2006.01)
*H04N 5/77* (2006.01)
*H04N 5/783* (2006.01)

(52) U.S. Cl.
CPC ..... *H04N 5/23254* (2013.01); *H04N 5/23293* (2013.01); *H04N 5/772* (2013.01); *H04N 5/783* (2013.01)

(58) Field of Classification Search
CPC .......... H04N 19/00–99; H04N 5/3745–37455; H04N 5/378; H04N 5/3355
USPC .............................................. 348/384.1, 308
See application file for complete search history.

(56) References Cited

U.S. PATENT DOCUMENTS

| | | | |
|---|---|---|---|
| 2003/0107648 A1* | 6/2003 | Stewart .............. | G08B 13/1966 348/143 |
| 2003/0146981 A1* | 8/2003 | Bean ...................... | H04N 5/232 348/222.1 |
| 2007/0013808 A1 | 1/2007 | Tagawa | |
| 2007/0104462 A1 | 5/2007 | Saito et al. | |
| 2009/0189994 A1 | 7/2009 | Shimonaka | |
| 2010/0079620 A1 | 4/2010 | Kuriyama | |
| 2010/0214439 A1 | 8/2010 | Oshima et al. | |
| 2010/0265344 A1* | 10/2010 | Velarde .................. | H04N 5/783 348/208.16 |
| 2010/0295957 A1 | 11/2010 | Larsson | |
| 2015/0147042 A1 | 5/2015 | Miyahara et al. | |
| 2016/0173779 A1* | 6/2016 | Weber ................ | H04N 5/23251 348/208.4 |

FOREIGN PATENT DOCUMENTS

| | | |
|---|---|---|
| CN | 104967803 | 10/2015 |
| CN | 105282420 | 1/2016 |
| EP | 1 420 579 | 9/2007 |
| JP | 2005-039763 | 2/2005 |
| JP | 2005-117419 | 4/2005 |
| JP | 2008-141354 | 6/2008 |
| JP | 4958807 | 3/2012 |
| JP | 4980982 | 4/2012 |
| KR | 1020100036964 | 4/2010 |

OTHER PUBLICATIONS international Search Report dated Apr. 23, 2018 issued in counterpart application No. PCT/KR2018/001115, 9 pages.
Chinese Office Action dated May 25, 2021 issued in counterpart application No. 201810075437.X, 18 pages.

\* cited by examiner

ELECTRONIC DEVICE AND METHOD FOR CAPTURING IMAGE IN ELECTRONIC DEVICE

PRIORITY

This application claims priority under 35 U.S.C. § 119(a) to Korean Patent Application Serial No. 10-2017-0012248 filed in the Korean Intellectual Property Office on Jan. 25, 2017, the disclosure of which is incorporated herein by reference.

BACKGROUND

1. Field of the Disclosure

The present disclosure relates generally to electronic devices and methods for capturing images in electronic devices.

2. Discussion of the Related Art

Recently, electronic devices are providing more diversified services and additional functions. Various applications executable on electronic devices are being developed to meet the demand of diverse users and to increase the utility of electronic devices.

A camera application may permit a user to take a selfie or a background picture using the camera of her electronic device. The electronic device may include a camera module for capturing images. The camera module may typically include a lens for collecting light, a photodiode for converting the collected light into an electrical signal, and an analog-to-digital converter (ADC) for converting the electrical signal, which is an analog signal, into a digital electrical signal. A process of a camera module that converts electrical signals from multiple photodiodes into digital electrical signals and outputs the digital electrical signals may be called a "read-out".

An electronic device may capture images at a low speed or a high speed. Low-speed image capturing may mean capturing images to depict an object moving faster than normal according to the capturing speed, which is represented as frames per second (fps). High-speed image capturing may mean capturing images to depict an object moving slower than normal.

For high-speed image capturing, conventional electronic devices capture the overall video through the camera module at a preset capturing speed (e.g., 120 fps to 240 fps), and upon replaying the video, selects only a portion to be depicted in slow motion.

However, increasing the capturing speed to capture a quickly moving object may result in high-speed capturing of immaterial portions, causing the video to be bulky and causing overload in downstream processing of the camera module, resulting in increased power consumption.

The bits per second (bps) necessary per external output line in the camera module for high-speed capturing is 6 Gbps for 1000 fps, and the raw volume of video is 2.6 GB. As such, the increased volume of the video captured at a high speed may delay the storing and processing of frame data.

SUMMARY

Accordingly, an aspect of the present disclosure provides an electronic device and method for capturing a video by the same, which allow high-speed capturing to be performed only at particular times when it is required upon video capturing.

According to an aspect of the present disclosure, an electronic device includes an image capturing device and a processor electrically connected with the image capturing device, wherein the processor is configured to obtain a first portion of a video at a first capturing speed during a first period using the image capturing device, control a first notification to indicate obtaining a second portion of the video at a set second capturing speed when the second capturing speed is set as a speed of capturing the video based on a result of analyzing the first obtained portion, and obtain the second portion at the second capturing speed during a second period following the first period using the image capturing device.

According to another aspect of the present disclosure, a method for capturing an image in an electronic device includes obtaining a first portion of a video at a first capturing speed during a first period using an image capturing device of the electronic device, controlling a first notification to indicate obtaining a second portion of the video at a set second capturing speed when the second capturing speed is set as a speed of capturing the video based on a result of analyzing the first obtained portion, and obtaining the second portion at the second capturing speed during a second period following the first period using the image capturing device.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
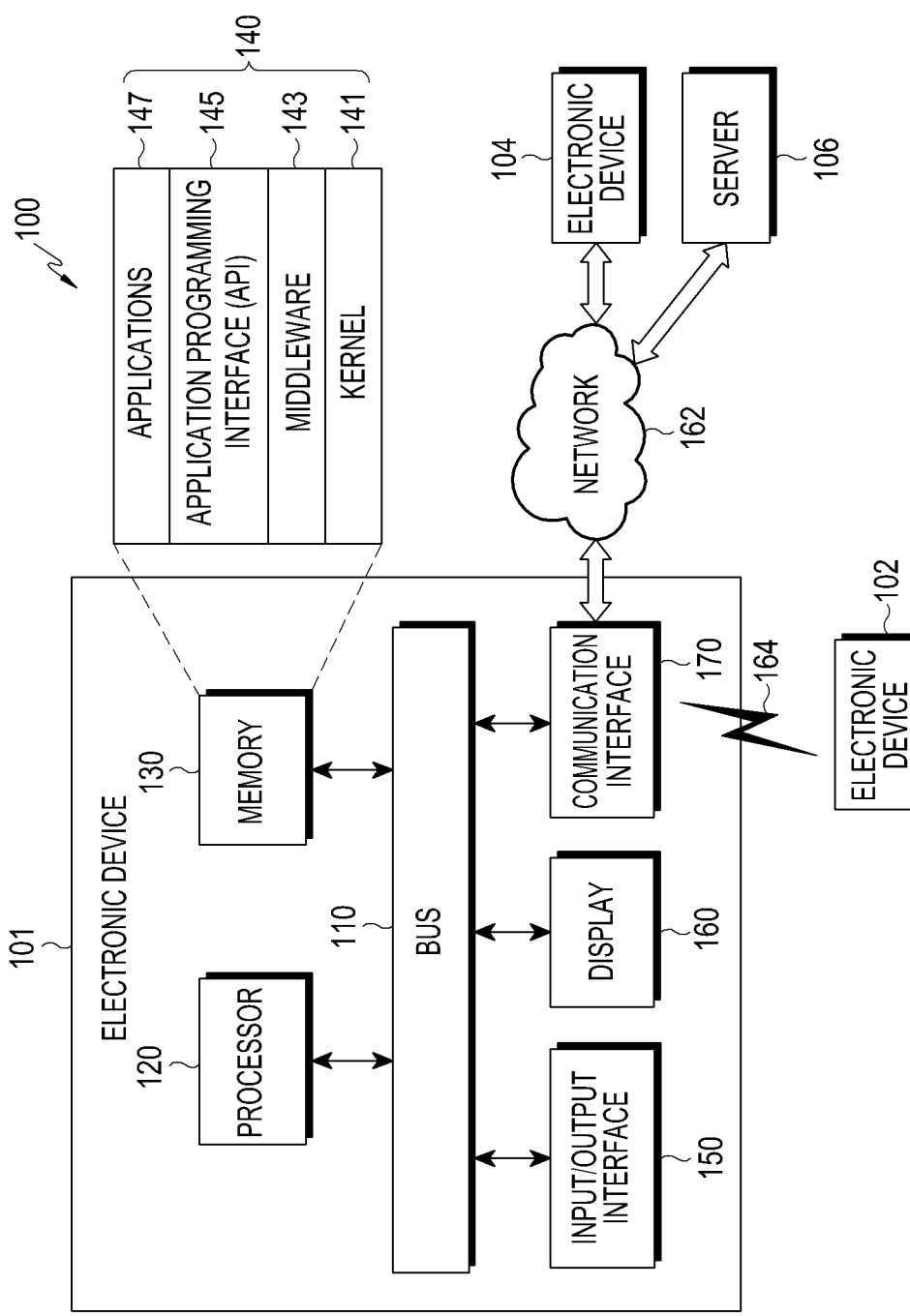
FIG. 1 is a view illustrating a network environment, according to an embodiment of the present disclosure.

Hereinafter, embodiments of the present disclosure are described with reference to the accompanying drawings. However, it should be understood that there is no intent to limit the present disclosure to the particular forms disclosed herein; rather, the present disclosure is intended to be construed to cover various modifications, equivalents, and/or alternatives of embodiments of the present disclosure. In the description of the accompanying drawings, similar reference numerals may be used to designate similar elements.

It is to be understood that the singular forms "a," "an," and "the" include plural references unless the context clearly dictates otherwise. As used herein, the terms "A or B" or "at least one of A and/or B" may include all possible combinations of A and B.

The terms "first" and "second" may modify various components regardless of importance and/or order and are used to distinguish a component from another without limiting the components. When an element (e.g., a first element) is referred to as being operatively or communicatively "coupled with/to", or "connected with/to" another element (e.g., a second element), it can be coupled or connected with/to the other element directly or via another element (e.g., a third element).

As used herein, the term "configured to" may be interchangeably used with other terms, such as "suitable for," "capable of," "modified to," "made to," "adapted to," "able to," or "designed to", in hardware or software. The term "configured to" may mean that a device performs an operation together with another device or part thereof. For example, the expression a "processor configured (or set) to perform A, B, and C" may mean a generic-purpose processor (e.g., a central processing unit (CPU) or an application processor (AP)) that performs the operations by executing one or more software programs stored in a memory device or a dedicated processor (e.g., an embedded processor) for performing the operations.

An electronic device may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. Examples of the smart home appliance may include at least one of a television, a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

The electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller machines (ATMs), point of sales (POS) devices, or internet of things (IoT) devices (e.g., a light bulb, various sensors, a sprinkler, a fire alarm, a thermostat, a street light, a toaster, fitness equipment, a hot water tank, a heater, or a boiler).

The electronic device may be at least one of a part of a piece of furniture, a building/structure or vehicle, an electronic board, an electronic signature receiving device, a projector, or various measurement devices (e.g., devices for measuring water, electricity, gas, or electromagnetic waves). The electronic device may be flexible or may be a combination of the above-described electronic devices. The electronic device is not limited to the above-described embodiments. As used herein, the term "user" may denote a human or another device (e.g., an artificial intelligence electronic device) using the electronic device.

Referring to FIG. 1, an electronic device 101 is included in a network environment 100. The electronic device 101 includes a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a CPU, an AP, or a communication processor (CP). The processor 120 may control at least one of the other components of the electronic device 101 or perform an operation or data processing relating to communication.

The memory 130 may include a volatile and/or nonvolatile memory. The memory 130 may store commands or data related to at least one other component of the electronic device 101.

The memory 130 may store software and/or a program 140. The program 140 may include a kernel 141, middleware 143, an application programming interface (API) 145, and/or an application program (or applications) 147. At least a portion of the kernel 141, middleware 143, or API 145 may denote an operating system (OS). The kernel 141 may control or manage system resources (e.g., the bus 110, the processor 120, or the memory 130) used to perform operations or functions implemented in other programs (e.g., the middleware 143, the API 145, or the applications 147). The kernel 141 may provide an interface that allows the middleware 143, the API 145, or the applications 147 to access the individual components of the electronic device 101 to control or manage the system resources.

The middleware 143 may function as a relay to allow the API 145 or the applications 147 to communicate data with the kernel 141. The middleware 143 may process one or more task requests received from the applications 147 in order of priority. For example, the middleware 143 may assign a priority of using system resources (e.g., the bus 110, the processor 120, or the memory 130) of the electronic device 101 to at least one of the applications 147 and process one or more task requests. The API 145 is an interface allowing the applications 147 to control functions provided from the kernel 141 or the middleware 143. For example, the API 145 may include at least one interface or function (e.g., a command) for filing control, window control, image processing or text control. The input/output interface 150 may transfer commands or data input from the user or other external device to other component(s) of the electronic device 101 or may output commands or data received from other component(s) of the electronic device 101 to the user or other external devices.

The display 160 may include a liquid crystal display (LCD), a light emitting diode (LED) display, an organic light emitting diode (OLED) display, a microelectromechanical systems (MEMS) display, or an electronic paper display. The display 160 may display various contents (e.g., text, images, videos, icons, or symbols) to the user. The display 160 may include a touchscreen and may receive a touch, a gesture, or a proximity or hovering input using an electronic pen or a body portion of the user. The communication interface 170 may set up communication between the electronic device 101 and an external electronic device (e.g., a first electronic device 102, a second electronic device 104, or a server 106). The communication interface 170 may be connected with the network 162 through wireless or wired communication to communicate with the external electronic device (e.g., the first electronic device 102, the second external electronic device 104 or the server 106).

The wireless communication may include cellular communication which uses at least one of long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). The wireless communication may further include at least one of wireless fidelity (Wi-Fi), bluetooth, bluetooth low power (BLE), zigbee, near field communication (NFC), magnetic secure transmission (MST), radio frequency, or body area network (BAN). The wireless communication may include a global navigation satellite system (GNSS), such as a global positioning system (GPS), a global navigation satellite system (Glonass), a beidou navigation satellite system (Beidou) or Galileo, or the European global satellite-based navigation system. Hereinafter, the terms "GPS" and the "GNSS" may be interchangeably used. The wired connection may include at least one of a universal serial bus (USB), a high definition multimedia interface (HDMI), a recommended standard (RS)-232, a power line communication (PLC), or a plain old telephone service (POTS). The network 162 may include at least one of a computer network (e.g., a local area network (LAN) or a wide area network (WAN)), Internet, or a telephone network.

The first and second external electronic devices 102 and 104 each may be a device of the same or a different type from the electronic device 101. All or some of operations executed on the electronic device 101 may be executed on another or multiple other electronic devices 102 and 104, or the server 106. When the electronic device 101 performs some function or service automatically or upon a request, the electronic device 101, instead of executing the function or service on its own, may request another device to perform at least some functions associated therewith. The other electronic device may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used.

Figure 2:
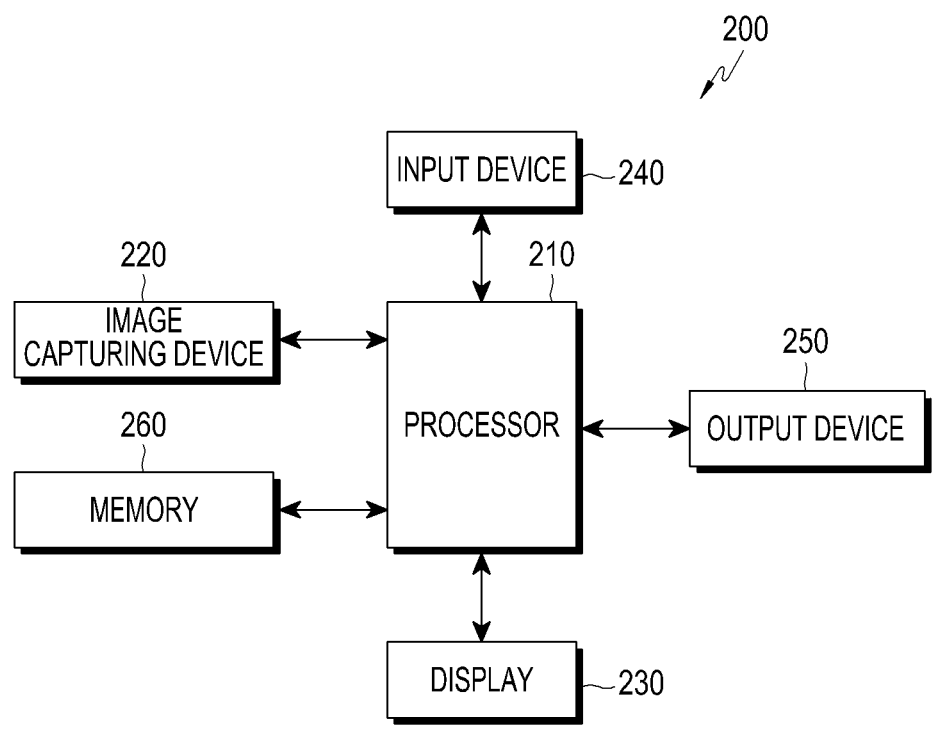
FIG. 2 is a block diagram illustrating a configuration of an electronic device for image capturing, according to an embodiment of the present disclosure.

FIG. 2 is a block diagram illustrating a configuration of an electronic device, according to an embodiment of the present disclosure.

Referring to FIG. 2, an electronic device 200 (which is the same or similar to the electronic device 101 of FIG. 1) includes a processor 210, an image capturing device 220, a display 230, an input device 240, an output device 250, and a memory 260.

The processor 210 may process information according to the operation of the electronic device or information according to the execution of a program, application, or function.

The processor 210 may control the image capturing device 220 to capture a video according to a video capturing request. The processor 210, when capturing begins, may control the image capturing device to capture the video at a preset first capturing speed (e.g., 60 fps). While capturing the video at the first capturing speed, the processor 210 may perform image analysis on a first portion of the video obtained at the first capturing speed and obtain a second portion of the video at a second capturing speed to which the capturing speed has changed based on the results of the image analysis.

The processor 210 may detect at least one object included in the data output at the first capturing speed before changing to the second capturing speed (i.e., the first portion of the video) from the sensor for video capturing, by performing image analysis on the first portion of the video and identifying whether it needs to change to a second capturing speed for high-speed capturing based on a variation in motion of the detected object. For example, the processor 210 may identify the variation in motion of at least one object detected from multiple images corresponding to the first portion by tracking frame data output from the image capturing device 220 during a first period. The variation in motion of the object may be identified using an image analysis algorithm (e.g., object detection, object classification, and object tracking algorithm). The image analysis algorithm may identify how similar the currently received frame is to previous frames in the path of motion of an object, and when the same object is recognized, the algorithm may continue to track the object in the frames received afterwards. According to an embodiment of the present disclosure, tracking and analyzing an object may also be possible by other various methods other than using the algorithm.

The processor 210 may track a moving object identified from the frames output from the image capturing device 220 for a predetermined time (first period) after video capturing has started, may identify motion information (e.g., at least one of motion speed, position, color, shape, or texture) about the detected object, and may identify a variation in motion of the object based on the identified motion information.

The processor 210 may automatically change to the capturing speed for high-speed capturing based on the motion of the object in a particular area of the frame set by the user. For example, when the processor 210 transmits a control signal to change the capturing speed to the image capturing device 220, high-speed capturing may automatically be triggered in the image capturing device 220. A particular area may automatically be set using autofocusing and object detection.

The particular area may be set as a portion of the image displayed on the touch area (position) for entry through the touchscreen. For example, when the user touches the particular area displayed on the touchscreen, the motion of the object selected by the user may be identified from the displayed image in response to the reception of the touch signal. The motion of the object may be identified through a variation in motion of the object by comparing the frames of the video displayed thus far. Upon identifying that the motion path (e.g., inter-pixel distance) of the object is varied above a preset path threshold, the processor may transmit a control signal to the image capturing device to automatically change to the second capturing speed to high-speed capturing. The processor 210 may output notification information to indicate high-speed capturing.

The processor 210 may set the capturing speed of the video as the second capturing speed based on a variation in pixel values of the images of the first obtained portion. For example, the processor 210 may compare pixel values of the image currently obtained with pixel values of the image previously obtained and identify whether it is required to change the video capturing speed to the high-speed capturing speed (i.e., the second capturing speed) based on the results of comparison. For example, the processor 210 may divide first and second images of the first portion into areas that have a particular pixel size (e.g., 100×100 pixels), compare the pixel values of each area of the first image with the pixel values of each area of the second image, and identify whether the differences in pixel values are a threshold or more. Upon identifying, as a result of the comparison, that there are a predetermined number of areas having multiple pixel values in which differences in the pixel values are the threshold or more or such areas are positioned adjacent each other, the processor 210 may recognize that a variation in the ambient environment where the video is captured or a variation in the object is large (i.e., high-speed capturing is required).

The processor 210 may previously identify that an event requiring high-speed capturing may occur based on the results of analysis of the first portion of the obtained video. To capture the video at a high speed, the processor 210 may previously set a first time for switching to high-speed capturing before the event actually occurs and a second time for indicating that it switches to high-speed capturing. Here, the second time may be the same as the first time, a predetermined time before the first time, or a predetermined time after the first time. The first time may be a time automatically set based on image analysis, or a time manually set in response to the user's request. The change of the capturing speed may be performed manually or automatically. According to an embodiment of the present disclosure, the case where the second time is set to be a predetermined time after the first time may be the case where the change of the capturing speed is performed manually (i.e., requested by the user). In such a case, upon receiving an input (i.e., button touch input) by the user, the processor 210 may set the current time as the first time and immediately transmit a control signal to change the capturing speed to the image capturing device 220. The processor 210 may set the time when the control signal is transmitted or a predetermined time thereafter as the second time, and the processor 210 may output notification information to indicate the change in the capturing speed at the second time after the control signal is transmitted. Here, the predetermined time may be set by the user's selection. For example, the notification information may be output for a preset time or continuously for the time when high-image capturing is performed.

The processor 210, after outputting the notification information to notify the user of the switch to high-image capturing at the second time, may transmit a control signal to the image capturing device 220 to change the capturing speed at the first determined time. When the image capturing device 220 receives the control signal from the processor 210, the read-out circuit may transmit the control signal to the pixel array to change the speeds at which the pixel signals of the pixel array are read-out to the second capturing speed (e.g., 1000 fps). Here, the read-out speed may be the same or different from the speed at which the frame is output from the image capturing device 220 (e.g., the output interface of the image sensor) to an external circuit (i.e., the processor 210). According to an embodiment of the present disclosure, the processor 210 may control the image capturing device 220 to proceed with high-speed capturing for a preset time (e.g., 2 seconds).

The processor 210 may determine the second time based on at least one of the state of the memory of the image capturing device 220, the output speed of the image capturing device 220, or the control signal output through the output line (PIN) of the image capturing device 220.

Upon identifying that high-speed capturing is required, the processor 210 may immediately and automatically perform high-speed capturing. Since the processor 210 may receive a request for high-speed capturing from the user, the processor 210 may set the time for predicting high-speed capturing as the second time. The processor 210 may transmit a control signal to the image capturing device to change to the second capturing speed to high-speed capturing at the first time. The second time may be the same as the first time, a predetermined time before the first time, or a predetermined time after the first time.

The processor 210 may include part of the first obtained portion a predetermined time before the first time and part of the third obtained portion of the video a predetermined time after the third time to terminate the second capturing speed in the second obtained portion of the video at the second capturing speed, and generate a high-speed capturing portion of the video. Upon playing the video, the processor 210 may play the generated high-speed capturing portion of the video.

The processor 210 may output notification information to indicate the change in the capturing speed using at least one of an audio module, a vibration module, a display, or a light emitting output device (e.g., a camera flash or LED) 250. The notification information may be output as at least one of a light, a sound, a vibration, or a visual effect on the display 230. The processor 210 may previously set the first time and second time for high-speed capturing as default.

The processor 210 may control the output device 250 to notify the user that the capturing speed changes, or is scheduled to change, to the second capturing speed while the image capturing device 220 is capturing a video.

According to an embodiment of the present disclosure, the processor 210 may output the first notification information to predict high-speed capturing and the second notification information to indicate that high-speed capturing starts in different forms. When the determined second time arrives, the processor 210 may display the first notification information to predict high-speed capturing on the display, as a visual effect. When the determined first time arrives, the processor 210 may transmit a control signal to change the capturing speed to the image capturing device while simultaneously turning on the camera light to emit light for the second notification information to indicate the start of high-speed capturing.

Upon receiving a request to manually (e.g., display touch input or button input to camera module) change capturing speed from the user in response to the output of the notification information, the processor 210 may transmit the control signal to change to the second capturing speed to the image capturing device 220 immediately or at the predicted time.

The processor 210 may transmit only the signal to control the change from the first capturing speed to the second capturing speed to the image capturing device 220, and when the capturing speed of the video is changed by the image capturing device 220, the processor 210 may receive information about the change in capturing speed from the image capturing device 220. The processor 210 may output notification information to indicate the change in capturing speed based on the information about the change in capturing speed received from the image capturing device 220. Here, the image capturing device 220 may recognize the event is one requiring high-speed capturing based on the variation in motion of the object detected from the first portion of the video captured through image analysis, automatically change to the second capturing speed, and transmit information about the change in capturing speed to the processor 210 to indicate that the capturing speed of the video has changed.

According to an embodiment of the present disclosure, in the same or similar manner to changing the capturing speed from the first capturing speed to the second capturing speed to obtain the second portion of the video at the second capturing speed, the processor 210 may change the capturing speed from the second capturing speed back to the first capturing speed to obtain a third portion of the video during a third period at the first speed. For example, when the second portion is obtained completely, the processor 210 may control the image capturing device 220 to change from the second capturing speed to the first capturing speed, perform the second notification to indicate obtaining the third portion of the video at the first capturing speed, and obtain the third portion at the first capturing speed during the third period that follows the second period using the image capturing device. As the preset time to capture the video at the second capturing speed elapses, the processor 210 may identify the completion of obtaining the second portion, or as the processor 210 identifies the change to the first capturing speed based on the results of image analysis as it changes to the second capturing speed, the processor 210 may identify the completion of obtaining the second portion.

The processor 210, which may be a hardware module or software module (e.g., an application program), may be a hardware component (function) or a software component (program) including at least one of various sensors, a data measuring module, an input/output interface, a module for managing the state or environment of the electronic device, or a communication module as included in the electronic device.

According to an embodiment of the present disclosure, the image capturing device 220, which may be part of the input/output interface 150 of FIG. 1, part of the application 147, or may be the electronic device of FIG. 2 may capture an external view and output the result to the processor 210. The output result may be processed by the processor 210 and displayed on the display 230 or stored in the memory 260.

The image capturing device 220 may include a pixel array including pixels and photodiodes that convert received light into analog electrical signals, a read-out circuit, an input/output interface, and a memory for temporarily storing outputs from the read-out circuit. The read-out circuit may include an analog-to-digital converter (ADC) that converts analog electrical signals into digital electrical signals and outputs the digital electrical signals and a decoding circuit for scanning a plurality of pixels.

The image capturing device 220 may further include a control circuit for controlling the pixel array, the read-out circuit, the memory, and the input/output interface and an image processing circuit that analyzes and processes frames of a captured video. The image capturing device 220 may perform some functions of the processor 210 (e.g., changing the output speed of video, and/or analyzing a portion (e.g., the first portion or second portion) of the captured video) by the control circuit and the image processing circuit, respectively.

The image capturing device 220 may change the capturing speed to the high speed while capturing a video at the first capturing speed during a first period, capture the video at the second capturing speed for a set second period, and then capture the video at the first capturing speed.

The image capturing device 220 may read out pixel values from the pixels at the first capturing speed. The unit of the first capturing speed (e.g., 60 fps) may be the reciprocal of the time during which the read-out circuit receives an analog electrical signal corresponding to one frame from all the pixels in the pixel array and converts the received analog electrical signal into a digital electrical signal. For example, where it takes $\frac{1}{120}$ sec for the read-out circuit to receive an analog electrical signal and convert the analog electrical signal into a digital electrical signal, the first speed of the read-out may be 120 fps. The reciprocal of the cycle at which the read-out circuit outputs a digital signal corresponding to one frame may be denoted as the capturing speed. As set forth above, the read-out circuit of the image capturing device 220 may include an ADC that performs conversion at a relatively high speed or a decoding circuit that receives an electrical signal from a pixel at a relatively high speed. Thus, the first speed may be a relatively high speed.

The memory 230 of the electronic device may temporarily store various data generated while the program runs, as well as a program necessary for a functional operation according to an embodiment. The memory 230 may include a program area and a data area. The program area may store relevant information for driving the electronic device, such as an OS for booting up the electronic device. The data area may store data communicated and generated according to an embodiment of the present disclosure. The memory 230 may include at least one storage medium of a flash memory, a hard disk, a multimedia card, a micro-type memory (e.g., a secure digital (SD) or an extreme digital (xD) memory), a random access memory (RAM), or a read only memory (ROM). According to an embodiment of the present disclosure, the memory 230 may store frame data received from the image capturing device 220.

The input device 240 of the electronic device may transfer, to the processor 210, various information, such as number and character information entered from the user and signals entered in relation to setting various functions and controlling functions by the electronic device. The input device 240 may support a user input for running an application or module supporting a particular function. The input device 240 may include at least one of a key input means, such as a keyboard or keypad, a touch input means, such as a touch sensor or touchpad, a sound source input means, or various sensors. The input device 240 may include a gesture input means. Further, the input device 240 may include all types of input means that are currently in development or are to be developed in the future. The input device 240 may receive, from the user, information entered by the user through the touch panel of the display or various input interfaces and may transfer the received information to the processor 210. Further, the input device 240 may receive an input signal related to data to be transmitted to another electronic device from the user through a sound input means (e.g., a microphone) and transfer the received input signal to the processor 210.

The output device 250 of the electronic device 200 may include, or be configured separately from, the display 260. The output device 250 may include an audio module or a light. The audio module may output an audio signal according to the occurrence of notification information to predict or indicate the change in the video capturing speed under the control of the processor 210, and the light may emit light for the notification information at the second time. The audio module may output a sound as the audio signal and may include at least one of an audio codec, a microphone (MIC), a receiver, an earphone output (EAR_L) or a speaker.

The electronic device 200 may further include a means for outputting vibrations or a means for outputting smells. The means for outputting vibrations or the means for outputting smells, respectively, may output a vibration and smell according to the occurrence of notification information to predict or indicate the change in the video capturing speed.

The display 260 of the electronic device may output information on a result of running an operation (e.g., at least one of text, image, or video) under the control of the processor 210. The display 260 may display, on the screen, an input pad (e.g., a button) for entering at least one of various numbers, characters, or symbols on an input window, in various manners. The display 260 may display a screen of running a service according to the execution of various applications related to information communication. Further, when the display 260 is implemented in the form of a touchscreen, the display 260 may correspond to the touchscreen of the input device 240. The display 260, when implemented together with the input device 240 in the form of a touchscreen, may display various information generated according to the user's touch operation.

According to an embodiment of the present disclosure, the display 260 may display images included in the video captured using the image capturing device 220 as the video is played back. Where the video capturing speed need change, the display 260 may display notification to predict or indicate the change in the video capturing speed so that a visual effect is shown.

The display 260 of the electronic device may include at least one or more of an LCD, a thin film transistor LCD (TFT-LCD), an OLED display, an LED display, an active matrix OLED (AMOLED) display, a flexible display, and a three-dimensional (3D) display. Some of the displays may be configured in a transparent type or light-transmissive type allowing the outside to be viewed therethrough. This may be configured in the form of a transparent display including a transparent OLED (TOLED) display.

The electronic device 200 may further include, in addition to the display 260, another display unit (e.g., an expanded display unit or flexible display unit) or a display unit of an external electronic device (e.g., at least one of a wearable device, or an external terminal device) interworking with the electronic device 200. According to an embodiment of the present disclosure the components shown in FIG. 2 are not essential components, and the electronic device 200 may be implemented with more or less components than those shown. The position of the major components described above in connection with FIG. 2 may be varied according to various embodiments of the present disclosure.

Figure 3:
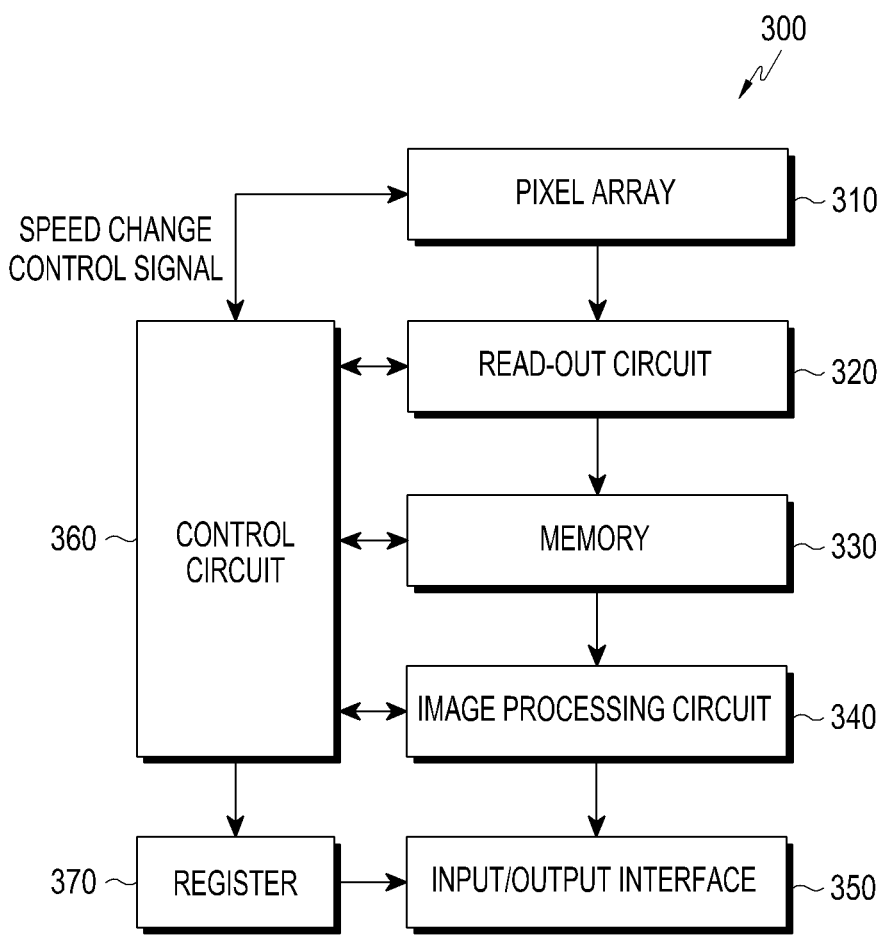
FIG. 3 is a view illustrating a configuration of an electronic device, according to an embodiment of the present disclosure.

FIG. 3 is a view illustrating a configuration of an electronic device, according to an embodiment of the present disclosure.

Referring to FIG. 3, according to an embodiment of the present disclosure, an electronic device 300 (which is the same or similar to the image capturing device 220 of FIG. 2) may capture the external view and output the captured image to an external circuit (e.g., the processor 120 or the processor 210). The output image may be image-processed by the external circuit and displayed on the display 160, or stored in an external memory 130.

The electronic device 300 may be an image capturing device or camera module that includes a camera lens and an image sensor. The electronic device 300 may represent the image sensor itself. The electronic device 300 may include a pixel array 310 including photodiodes for converting received light into analog electrical signals and a read-out circuit 320 that includes an ADC for converting analog electrical pixel signals into digital electrical pixel signals and outputting the digital electrical pixel signals, and a decoding circuit for scanning a plurality of pixels. The electronic device 300 may include a memory 330 that temporarily stores pixel signals output from the ADC or decoding circuit and then outputs it to a downstream part. The electronic device 300 may include an image processing circuit 340 that image-processes digital electrical pixel signals output from the read-out circuit 320 or the memory 330. The electronic device 300 may include an input/output interface 350 that outputs, to an external circuit, image-processed frame data corresponding to one frame which is output from the image processing circuit 340 and delivers signals from the external circuit to the control circuit 360.

The electronic device 300 may include a control circuit 360 that controls at least one of the pixel array 310, the read-out circuit 320, the memory 330, the image processing circuit 340, or the input/output interface 350. The electronic device 300 may include a register 370 capable of storing data (i.e., information related to control and input/output) transmitted/received between the control circuit 360 and the input/output interface 350. The register 370 may store information indicating the first and second capturing speed.

When an external circuit (e.g., the processor 210 of FIG. 2) is accessed, the register 370 may read out the information indicating the stored first and second capturing speed to the external circuit under the control of the control circuit 360. According to an embodiment of the present disclosure, the electronic device 300 may set the video capturing speed as the second capturing speed based on the first portion of the video obtained at the first capturing speed during the first period and the results of an analysis of the images contained in the first portion. The electronic device 300 may obtain the second portion at the second capturing speed during the second period that follows the first period. In other words, the electronic device 300 may change the capturing speed to the high speed while capturing the first video at the first capturing speed during the first period, capture the video at the second capturing speed (i.e., the high speed) during the second period, change the capturing speed back to the first capturing speed, and then capture the video.

According to an embodiment of the present disclosure, when the video capturing speed is set as the second capturing speed, the electronic device 300 may transmit, to the external circuit, a control signal to indicate that the second portion of the video is obtained at the set second capturing speed through the output device by the external circuit. The electronic device 300 may transmit, to the external circuit, a control signal to indicate that the capturing speed changes from the second capturing speed back to the first capturing speed and the third portion of the video is obtained during the third period, through the output device, by the external circuit. In response to the control signal, the external circuit may generate notification information and output the generated notification information through the output device.

The electronic device 300 may read out pixel values from the pixels at the first capturing speed. The first capturing speed may be a unit such as 60 fps, which may be the reciprocal of the time during which the read-out circuit 320 receives an analog electrical signal corresponding to one frame from each pixel in the pixel array 310 and converts the received analog electrical signal into a digital electrical signal. For example, where it takes ⅟₆₀ sec for the read-out circuit 320 to receive an analog electrical signal and convert the analog electrical signal into a digital electrical signal, the first speed of the read-out may be 60 fps. The reciprocal of the cycle at which the read-out circuit outputs a digital electrical signal corresponding to one frame may be denoted as the first capturing speed.

The pixel array 310 may include a plurality of pixels (e.g., multiple pixels and photodiodes arrayed in two dimensions). The pixel array 310 may output the analog signal corresponding to the frame of the video captured under the control of the control circuit 360. The pixel array 310, upon receiving a control signal from the control circuit 360 to change the capturing speed of the video being captured, may output the analog signal corresponding to the frame at the changed capturing speed (e.g., the second capturing speed).

The read-out circuit 320 may receive analog electrical signals from the pixel array 310, and may sequentially or simultaneously receive analog electrical signals from the plurality of pixels included in the pixel array 310. For example, the read-out circuit 320 may receive an analog electrical signal from a first pixel, an analog electrical signal from a second pixel, and then an analog electrical signal from a third pixel. The read-out circuit 320 may simultaneously receive analog electrical signals from the first pixel and the second pixel, and then, the read-out circuit 430 may simultaneously receive analog electrical signals from the third pixel and a fourth pixel. After simultaneously receiving the analog electrical signals from the first line of pixels of the pixel array 310, the read-out circuit 320 may simultaneously receive analog electrical signals from the next, second line of pixels, and the read-out circuit 320 may sequentially receive analog electrical signals up to the last line of the pixel array 310.

The read-out circuit 320 may include a circuit (e.g., a switching device), which is capable of receiving an analog electrical signal from each of the plurality of pixels. The read-out circuit 320 may also include an ADC that converts an analog electrical signal into a digital electrical signal and outputs the digital electrical signal. According to an embodiment of the present disclosure, the read-out circuit 320 may include a plurality of ADCs.

The decoding circuit included in the read-out circuit 320 may include a row decoder capable of determining the row to be read out and a column decoder capable of determining the column to be read out. A row and column to be read out may be determined by the row decoder and the column decoder, and thus, a pixel to be read out may be determined. A plurality of switches may be disposed between the row decoder and the pixel array 310, and a switch corresponding to a row determined to be read out may be controlled in an on state. A plurality of switches may be disposed between the column decoder, ADC circuit and the pixel array 310, and a switch corresponding to a row determined to be read out may be controlled in an on state. Meanwhile, the column decoder and the ADC circuit may include a plurality of ADCs, in which case the column decoder and the ADC circuit may parallel-convert analog electrical signals from a plurality of pixels into digital electrical signals for substantially the same period of time. Thus, a read-out may be performed at a relatively high speed as compared with when one ADC is included.

The memory 330 may temporarily store the digital electrical pixel signal output from the read-out circuit 320 before outputting frame data corresponding to one frame to an external circuit (e.g., the bus 110, the processor 120, or the memory 130). The frame data stored in the memory 330 may be output at the output speed set according to the input/output interface for frame data. When further including the memory 330, the electronic device 300 may set the read out speed and the speed of outputting of the electronic device 300 to be different from each other. Accordingly, although a read-out is performed at a relatively high speed, the required output speeds or other various types of interface requirements may be met.

The image processing circuit 340 may change the format of the digital electrical pixel signal output from the memory 330 and perform color calibration on the signal.

The image processing circuit 340 may include an image analyzing module for analyzing the frame corresponding to the digital electrical pixel signal output from the memory 330. The image analyzing module may be configured in the image sensor separately from the image processing circuit 340. After video capturing begins, the image processing circuit 340 may detect an object to be used for switching to high speed capturing based on the first frame output, track at least one object from the next frame output, and identify a variation in motion of the detected object. For example, the image processing circuit 340 may compare the frame previously output with the frame being currently output, identify the variation in the pixel value of the object area, and identify the variation in the motion of the object. The image processing circuit 340 may deliver the results of identifying the variation in motion of the object to the control circuit 360. According to an embodiment of the present disclosure, the image processing circuit 340 may determine whether to perform high-speed capturing at the second capturing speed immediately after capturing the video at the first capturing speed based on the results of identifying the variation in motion of the object (i.e., whether high-speed capturing is needed), and the image processing circuit 340 may deliver the results of the determination to the control circuit 360. The control circuit 360 may determine whether the high-speed capturing is needed based on the results of identifying the variation in motion of the object and set the second capturing speed. The image processing circuit 340, unless configured inside the image sensor (i.e., the electronic device 300), may separately be configured downstream of the image sensor.

The input/output interface 350 may communicate data with an external circuit based on the interface according to wired or wireless communication standards. The input/output interface 350 may transmit the frame data output from the image processing circuit 340 or memory 330 to the external circuit based on the set output speed. The input/output interface 350, as accessed by the external circuit, may transmit the first and second capturing speed information stored in the register 370. Or, the input/output interface 350 may transmit first and second capturing speed-related information to an output image file (e.g., a message for transmitting frame data). Also, when a particular event (e.g., an event to indicate that the capturing speed need change) occurs, the input/output interface 350 may transmit, to the external circuit, identification information to indicate the capturing speed has changed and/or information about the first and second capturing speed, and a control signal corresponding to the control information indicating the output of notification information through the output PIN may be transmitted.

The control circuit 360 (e.g., the processor 120 or 210) may control the pixel array 310, the read-out circuit 320, the memory 330, the image processing circuit 340, the output interface 350, and/or the register 370.

The control circuit 360 may control the input/output interface 350 to output, to the external circuit, frame data corresponding to the digital pixel signal output at the first capturing speed for capturing a video from the read-out circuit 310.

The control circuit 360 may determine, before high-speed capturing, whether high-speed capturing is required at the second capturing speed, immediately after capturing the video at the first capturing speed based on the results of identifying the variation in the motion of the object received from the image processing circuit 340. According to an embodiment of the present disclosure, the control circuit 360 may receive information about the results of a determination from the image processing circuit 350. The control circuit 360 may set the first time, which is the time when the image capturing switches to the high-speed capturing (i.e., the time when the first capturing speed changes to the second capturing speed), and the second time, which is the time for indicating the switch to the high-speed capturing, based on the information about the results of the determination received from the image processing circuit 350. The control circuit 360 may store the set first and second times in the register 370. When the first time arrives, the control circuit 360 may transmit, to the pixel array 310, a control signal to output frame-corresponding analog signals at the second capturing speed stored in the register 370.

According to an embodiment of the present disclosure, the capturing speed may be changed to the second capturing speed according to the motion of the object analyzed by the image processing circuit 340, and information about the change may be stored in the register 370. The information about the second capturing speed stored in the register 370 may be identified by the external circuit (e.g., the processor 210) through the input/output interface 350. The external circuit, upon receiving the information about the second capturing speed, may obtain the second portion of the video at the second capturing speed using the output device or display device. The second portion of the video (i.e., output notification information) may indicate that the video capturing speed has changed to the second capturing speed. The control circuit 360 may transmit the control signal for the notification information to the external circuit before, after, or simultaneously with outputting the frame data to the external circuit through the input/output interface 350.

The control circuit 360 may previously determine the second time at/before the time set by the timer, and the control circuit 360 may transmit, to the external circuit, the control signal to output the notification information at the second time. Accordingly, the external circuit may output the notification information to indicate that high-speed capturing will immediately be performed in various forms at the second time.

The control circuit 360 may control the pixel array 310 to change the first capturing speed to the second capturing speed at the first time and perform control to output, to the external circuit, notification information to indicate the change to the second capturing speed at the second time. Here, the first time denotes the time for changing to the second capturing speed for high-speed capturing while capturing the video at the first capturing speed, and the second time denotes the time for indicating the change to the second capturing speed. The second time may be a preset time before or after the first time, or may be the same as the first time. The notification information may be output as at least one of a light, a sound, a vibration, a smell, or a visual display effect from the external circuit. When the determined second time arrives, the control circuit 360 may output the first notification information to predict high-speed capturing to the external circuit. When the determined first time is reached, the control circuit 360 may transmit a control signal to change capturing speed to the image capturing device, and output, to the external circuit, the second notification information to indicate the start of high-speed capturing.

An electronic device may comprise an image capturing device and a processor electrically connected with the image capturing device, wherein the processor may be configured to obtain a first portion of a video at a first capturing speed during a first period using the image capturing device, control a first notification to indicate obtaining a second portion of the video at a set second capturing speed when the second capturing speed is set as a speed of capturing the video based on a result of analyzing the first portion obtained, and obtain the second portion at the second capturing speed during a second period following the first period using the image capturing device.

The processor may be configured to set the second capturing speed of the video based on the result of analyzing the first obtained portion and control the image capturing device to change the capturing speed of the video to the set second capturing speed.

When the second portion is completely obtained, the processor may be configured to control the image capturing device to change the capturing speed from the second capturing speed to the first capturing speed, perform the second notification to indicate obtaining the third portion of the video at the first capturing speed, and obtain the third portion at the first capturing speed during the third period that follows the second period using the image capturing device.

The processor may be configured to detect an object from the first portion based on the result of analyzing the first portion captured at the first capturing speed, identify a variation in motion of the detected object, and when the identified variation in motion is a preset threshold or more, change the capturing speed to the second capturing speed and output notification information for the first notification.

The processor may be configured to set a first time when the capturing speed of the video changes to the second capturing speed and a second time for performing the first notification before the second period, change the first capturing speed to the second capturing speed at the first time in the second period, and perform the first notification at the second capturing speed after the second time.

The processor may be configured to output first notification information about the first notification to indicate obtaining the second portion at the second time, and when the first time arrives, output second notification information about the first notification to indicate obtaining the second portion continuously during the second period or for a preset time.

The second portion may include part of the first portion obtained a predetermined time before the first time and part of the third portion of the video obtained a predetermined time after the third time to terminate the second capturing speed.

The image capturing device may comprise a pixel array including a plurality of pixels, a read-out circuit receiving an analog signal from each of the plurality of pixels, converting the analog signal into a digital signal, and outputting the digital signal, and a register temporarily storing the digital signal output from the read-out circuit.

The image capturing device may comprise a control circuit controlling the pixel array to output the analog signal and change the capturing speed of the video and an image processing circuit detecting an object included in the first portion output at the first capturing speed and identifying the variation in motion of the detected object.

The processor may comprise a control circuit controlling a pixel array of the image capturing device to change the capturing speed of the video, and the first notification and the second notification may be performed using at least one of a light, a sound, a vibration, or a visual effect of the display.

The processor may identify a variation in the capturing speed of the video based on at least one of a state of a register of the image capturing device, a frame output speed of the image capturing device, or a control signal output through an output line (PIN) of the image capturing device.

Figure 4:
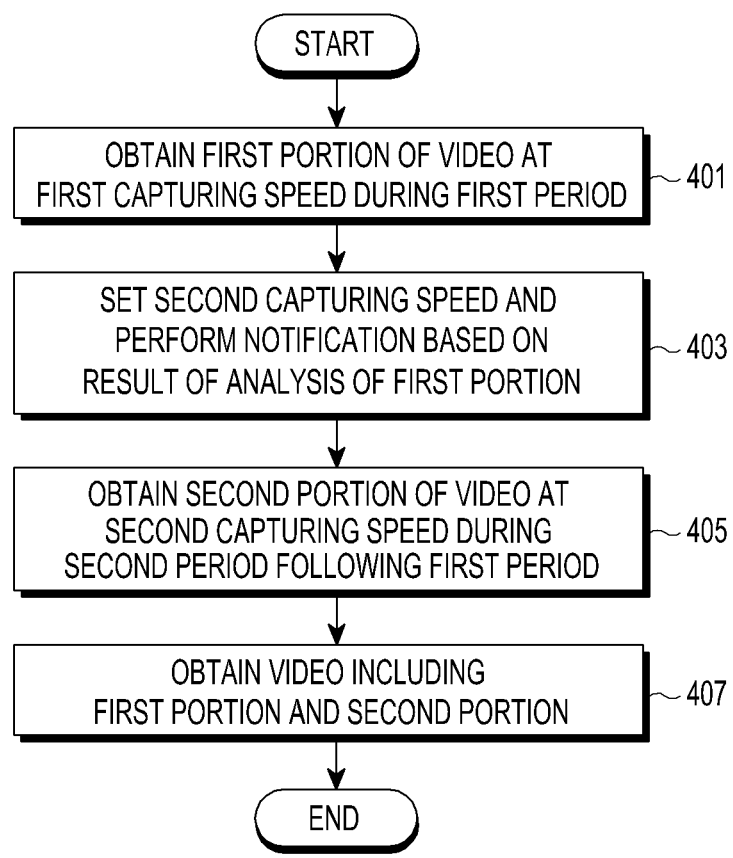
FIG. 4 is a flowchart illustrating operations of an electronic device, according to an embodiment of the present disclosure.

FIG. 4 is a flowchart illustrating operations of an electronic device, according to an embodiment of the present disclosure.

Referring to FIG. 4, in step 401, an electronic device obtains a first portion of a video during a first period at a first capturing speed (e.g., 60 fps) set according to a request for capturing the video.

In step 403, the electronic device analyzes the obtained first portion, sets a second capturing speed based on a result of the analysis, and performs a notification (hereinafter, a first notification) to indicate that a second portion of the video is obtained at the set second capturing speed. For example, the electronic device may analyze the first portion obtained during the first period through image analysis, detect at least one object included in the first portion, and determine whether the capturing speed of the video needs to change (i.e., if high-speed capturing is required), based on a variation in motion of the detected object. Where high-speed capturing is required, the electronic device may change the first capturing speed to the second capturing speed and output, through an output device, notification information to indicate the change to the second capturing speed. As the capturing speed of the video is set as the second capturing speed based on the result of analysis of the obtained first portion, the electronic device may directly perform the first notification to indicate obtaining the second portion of the video at the set second capturing speed or transmit a control signal to an external circuit so that the external circuit may perform the first notification.

In step 405, the electronic device obtains the second portion at the second capturing speed during the second period that follows the first period, using the image capturing device. For example, the electronic device may output the notification information for the first notification continuously during the second period or for a predetermined time.

In step 407, the electronic device obtains the video containing the first portion and the second portion.

According to an embodiment of the present disclosure, when the second portion is completely obtained, the electronic device may control the image capturing device to change from the second capturing speed to the first capturing speed and perform the second notification to indicate obtaining a third portion of the video at the first capturing speed. The electronic device may obtain the third portion at the first capturing speed during a third period that follows the second period using the image capturing device.

When the video capturing ends, the electronic device may store the video obtained until it ends (e.g., the video including the first portion, the second portion, and the third portion), and the electronic device may play the video according to a playback request.

According to an embodiment of the present disclosure, the electronic device may automatically change the video capturing speed to the second capturing speed as high-speed capturing is necessary while obtaining the first portion of the video captured at the first capturing speed upon capturing a video, thereby obtaining the second portion by high-speed capturing, subsequent to obtaining the first portion. Accordingly, the video may include images or videos (first portion and second portion) captured at different speeds. The electronic device may perform high-speed capturing at the second capturing speed during a particular period while capturing one video at the set first capturing speed.

Figure 5:
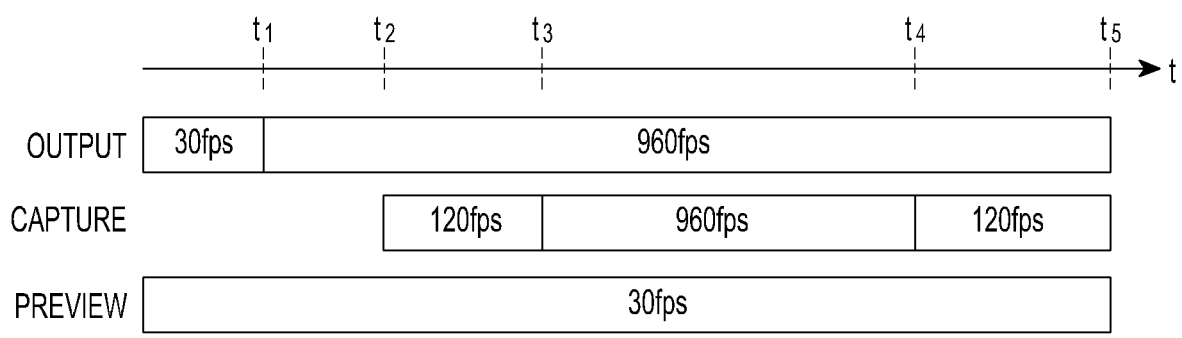
FIG. 5 is a view illustrating a notification function of an electronic device, according to an embodiment of the present disclosure.

FIG. 5 is a view illustrating a notification function of an electronic device, according to an embodiment of the present disclosure.

Referring to FIG. 5, an electronic device may identify the output speed of the pixel array or read-out circuit of the image capturing device, as a video capturing speed. For example, the electronic device may perform a notification function before or after the time t3 (e.g., the time of input of a queue) when a capturing speed is changed for high-speed capturing after the capturing time t2 and the time t1 (e.g., an auto queue time) when the image capturing device changes from the first output speed (e.g., 30 fps) to the second output speed (e.g., 960 fps). The electronic device may output notification information for the first notification to indicate high-speed capturing (i.e., capturing the video at 960 fps) at the time t3 when the first capturing speed (120 fps) changes to the second capturing speed (e.g., 960 fps). In another example, the electronic device may output the notification information for the first notification continuously during the second capturing speed period (i.e., from t3 to t4). The electronic device may change back to the first capturing speed (e.g., 120 fps) at the time t4 when the video capturing at the second capturing speed ends, capturing the video at the first capturing speed. The electronic device may terminate the video capturing at the time t5.

Figure 6:
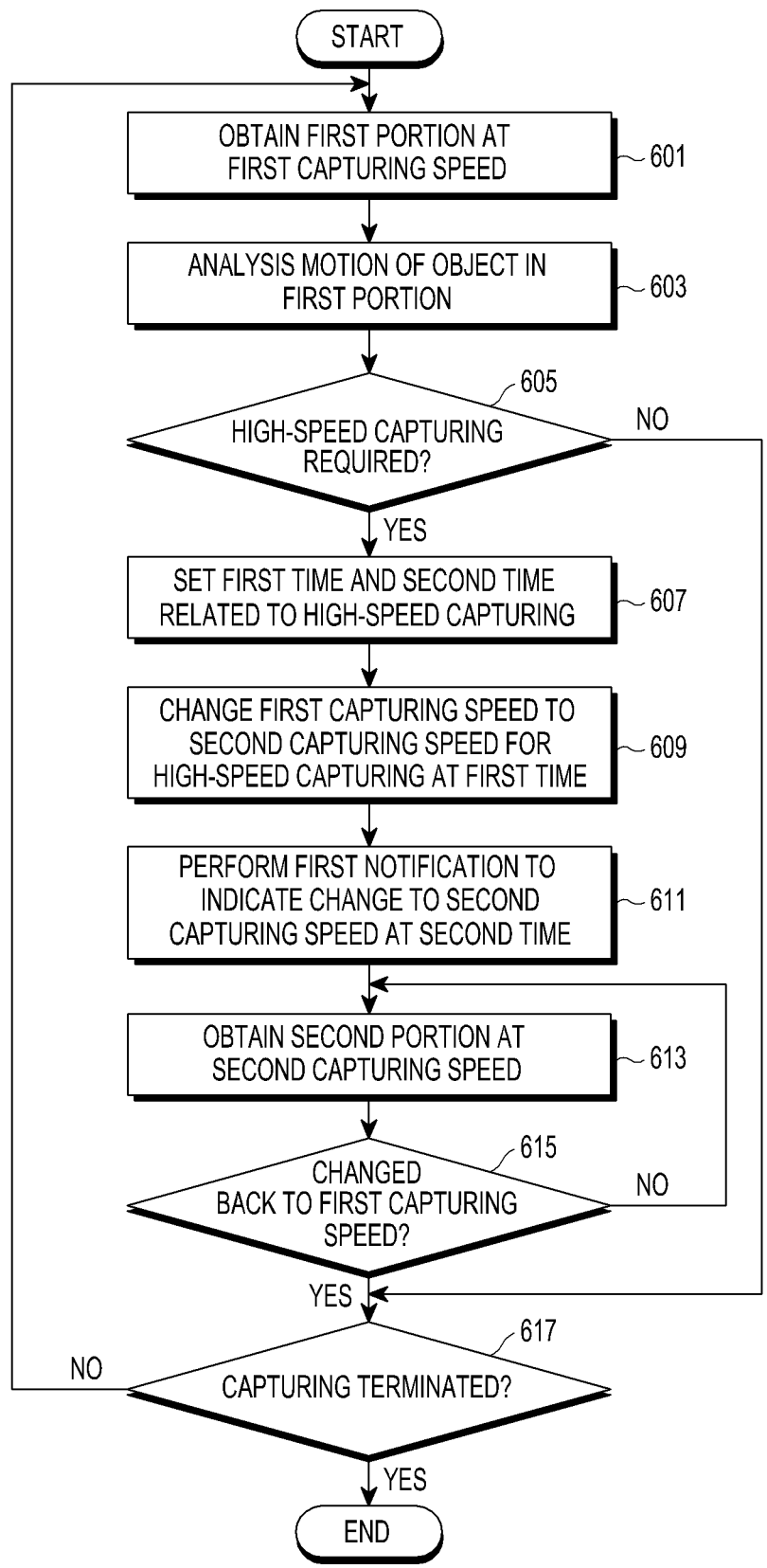
FIG. 6 is a flowchart illustrating operations of an electronic device, according to an embodiment of the present disclosure.

FIG. 6 is a flowchart illustrating operations of an electronic device, according to an embodiment of the present disclosure.

Referring to FIG. 6, an electronic device may start image capturing at the set first capturing speed using an image capturing device upon receiving a request for first video capturing.

In step 601, as the video capturing begins, the electronic device obtains the first portion (e.g., frames) of the video at the first capturing speed. The electronic device may store the images obtained at the first capturing speed and output a preview for the first portion of the obtained video.

In step 603, upon obtaining the first portion at the first capturing speed, the electronic device identifies a variation in motion of at least one object detected from the first portion. The electronic device may detect the object from the first portion using an image analyzing algorithm, compare the frames output from the image capturing device with each other, and identify the variation in motion of the detected object. When the variation in motion of the detected object is a preset threshold or more, the electronic device may determine that the first video immediately requires high-speed capturing. The image analysis may be performed whenever one frame is output from the image capturing device or at preset time intervals.

In step 605, the electronic device identifies whether high-speed capturing is required. When high-speed capturing is required, the electronic device performs step 607. When high-speed capturing is not required, the electronic device performs step 617.

In step 607, the electronic device sets the first time for changing to the second capturing speed and the second time for indicating the change to the second capturing speed, based on the variation in motion of the object analyzed in step 603 while capturing the first portion at the first capturing speed before obtaining the second image. When the capturing speed is set to be changed at the timing preset by a timer, the electronic device may set the preset timing or a time before the preset timing as the second time.

In step 609, the electronic device changes the capturing speed from the first capturing speed to the second capturing speed at the first time. According to an embodiment of the present disclosure, the processor of the electronic device may transmit a control signal to the image capturing device to change the capturing speed at the first time. The electronic device may identify the change to the second capturing speed based on at least one of a state of the memory of the image capturing device storing the digital signal corresponding to a frame, the output speed of the image capturing device, or control signals output through the output line (PIN) of the image capturing device. The electronic device may set the second time after identifying the change to the second capturing speed. In such a case, the second time may be set based on at least one of the output speed of the image capturing device or control signals output through the output line (PIN) of the image capturing device. Where the electronic device predicts that high-speed capturing will be performed shortly and indicates that the capturing speed changes, two distinct second times may be set for a prediction time and the same time as a capturing speed change time. The prediction time may previously be set in step 607, and the same time as the capturing speed change time may be set in step 609.

In step 611, the electronic device outputs notification information for the first notification to indicate the change to the second capturing speed at the second time.

In step 613, as high-speed capturing is performed at the changed second capturing speed, the electronic device obtains the second portion at the second capturing speed. The electronic device may store the second portion obtained from the image capturing device and output a preview video including the second portion.

In step 615, the electronic device identifies whether the capturing speed of the video changes back to the first capturing speed. For example, the second capturing speed may change back to the first capturing speed at, before, or after the end of high-speed capturing, as identified through settings or image analysis. When the second capturing speed is identified as changing back to the first capturing speed, the electronic device may repeat step 501. In contrast, unless the second capturing speed is identified as changing back to the first capturing speed, the electronic device may repeat step 613.

In step 617, the electronic device identifies whether the video capturing has ended. When the video capturing is identified as having ended, the electronic device terminates the video capturing, and when the video capturing is not terminated, the electronic device repeats step 601.

According to an embodiment of the present disclosure, when the second capturing speed changes back to the first capturing speed after steps 615 and 617, the electronic device may change to the first capturing speed, and perform the second notification to indicate obtaining a third portion of the video.

When the first notification is performed in the operation of FIG. 6, the electronic device may output the first notification information for the first notification to predict high-speed capturing before the second time, and then, output the second notification information for the first notification to indicate the start of high-speed capturing at or after the second time. Here, the first notification information and the second notification information may be output in the same or different manners.

Figure 7:
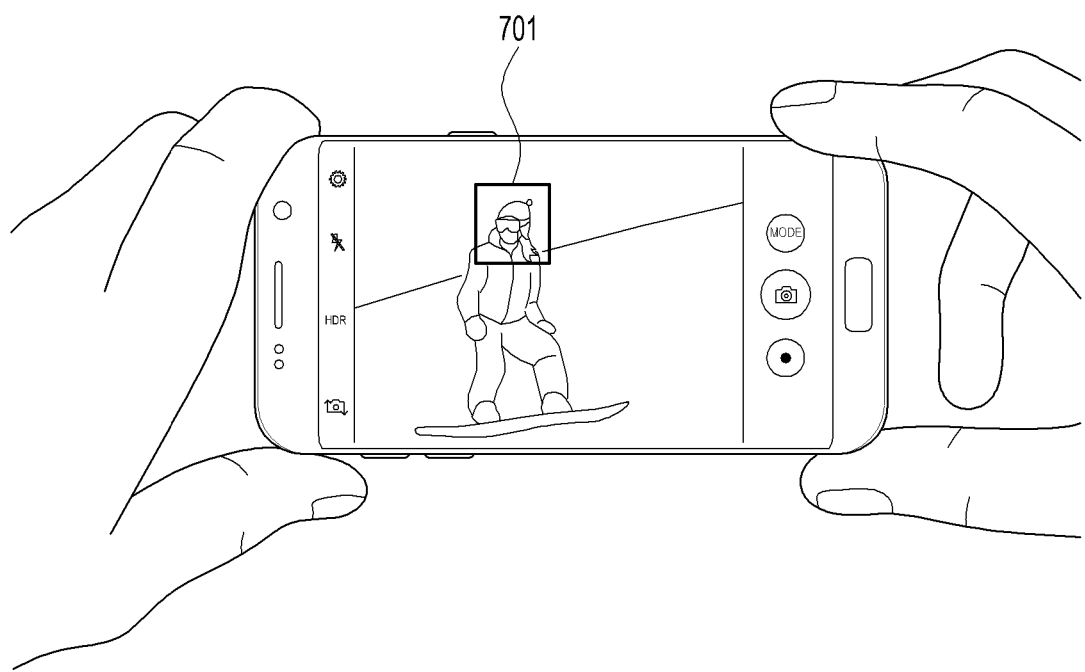
FIG. 7 is a view illustrating a screen for image capturing by an electronic device, according to an embodiment of the present disclosure.

FIG. 7 is a view illustrating a screen for image capturing by an electronic device, according to an embodiment of the present disclosure.

Referring to FIG. 7, an electronic device may detect an object 601 at the first capturing speed based on the frame first output after video capturing has started and may track the variation in motion of the object from the frames output subsequently. When the variation in motion of the object is a preset threshold or more, the electronic device may determine that high-speed capturing is required. According to an embodiment of the present disclosure, the electronic device may detect, as the object, an area (object) target for auto-focusing, and analyze the variation in motion of the detected object.

The electronic device may compare the image currently input with the images previously input, and when at least part of the currently input image is varied above a threshold or more, the electronic device may identify that it is time for high-speed capturing and perform high-speed capturing. For example, where a variation in pixel value of at least part of the currently input image is varied above the threshold, the electronic device may identify that it is time for high-speed capturing.

The electronic device, upon receiving a particular input signal for high-speed capturing from the user, may identify that it is time for high-speed capturing and perform high-speed capturing.

Figure 8A:
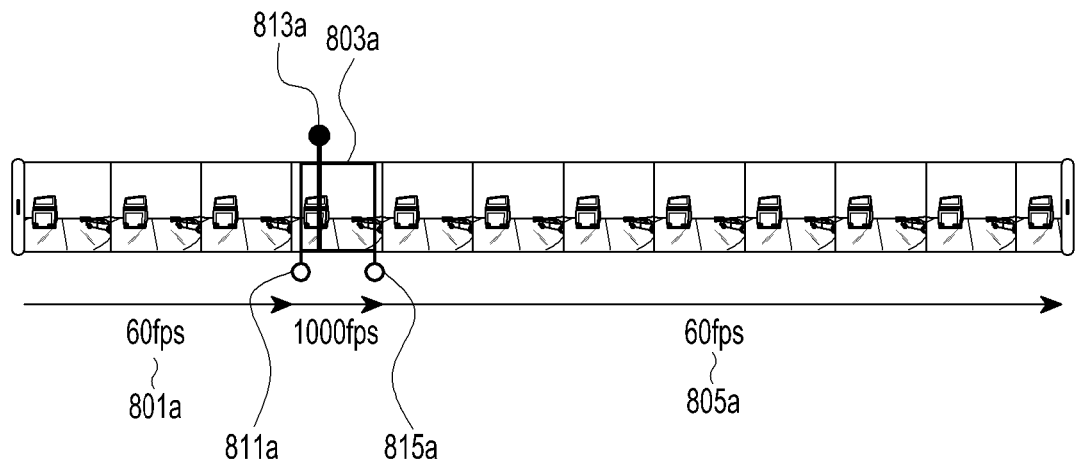
FIGS. 8A and 8B are views illustrating changing capturing speed in an electronic device, according to an embodiment of the present disclosure.
Figure 8B:
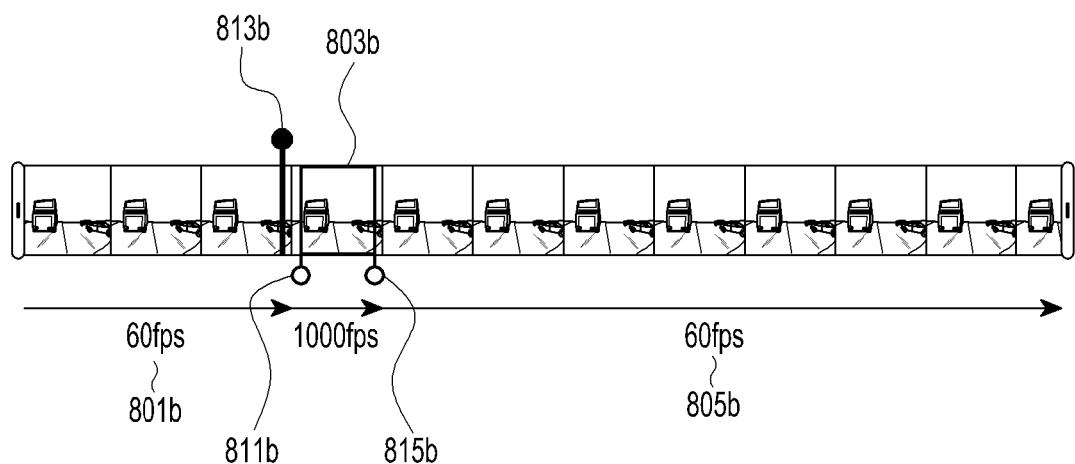

FIGS. 8A and 8B are views illustrating changing capturing speed in an electronic device, according to an embodiment of the present disclosure.

Upon identifying the context where high-speed capturing is required, an electronic device, may determine the first time 811*a*, when the capturing speed changes from the first capturing speed (e.g., 60 fps) to the second capturing speed (e.g., 1000 fps), and the second time 813*a*, when notification information indicates the change in capturing speed as shown in FIG. 8A. The electronic device may set the end time 815*a* for high-speed capturing. Since the first time 811*a* is earlier than the second time 813*a*, the electronic device may output notification information after identifying the changed capturing speed. For example, where the user enters a button to change the capturing speed, the electronic device determines the second time based on a state of the register of the image capturing device or output speed of frame data output from the image sensor or read-out circuit, and the electronic device may output the notification information after the capturing speed changes.

The electronic device may perform capturing at the first capturing speed (e.g., 60 fps) during a first capturing period 801*a* (e.g., the first period), which is a low-speed capturing period before the first time 811a. The electronic device may perform capturing at the second capturing speed (e.g., 1000 fps) during a second capturing period 803a (e.g., the second period), which is a high-speed capturing period after the first time 811a. The electronic device may perform capturing at the first capturing speed (e.g., 60 fps) during a third capturing period 805a when low-speed capturing is performed after the time 805a when the high-speed capturing is ended. The electronic device, upon receiving an end capturing request while performing capturing, may terminate the capturing of one video.

Referring to FIG. 8B, an electronic device, may determine the first time 811b when the capturing speed changes from the first capturing speed (e.g., 60 fps) to the second capturing speed (e.g., 1000 fps) and the second time 813b according to notification information to indicate the change in capturing speed. The electronic device may set the end time 815b for high-speed capturing. Since the first time 811b is earlier than the second time 813b, the electronic device may predict that high-speed capturing is required based on the variation in motion of the object, previously outputting notification information before the capturing speed changes. The second time 813b may be the time when first notification information is output to predict high-speed capturing. The second notification information may be output to indicate that the video capturing will change to high-speed capturing at, right before, or right after the first time 811b. The electronic device may perform capturing at the first capturing speed (e.g., 60 fps) during a first capturing period 801b which is a low-speed capturing period before the first time 811b. The electronic device may perform capturing at the second capturing speed (e.g., 1000 fps) during a second capturing period 803b which is a high-speed capturing period after the first time 811b. The electronic device may perform capturing at the first capturing speed (e.g., 60 fps) during a third capturing period 805b when low-speed capturing is performed after the time 805b when the high-speed capturing is ended.

Figure 9:
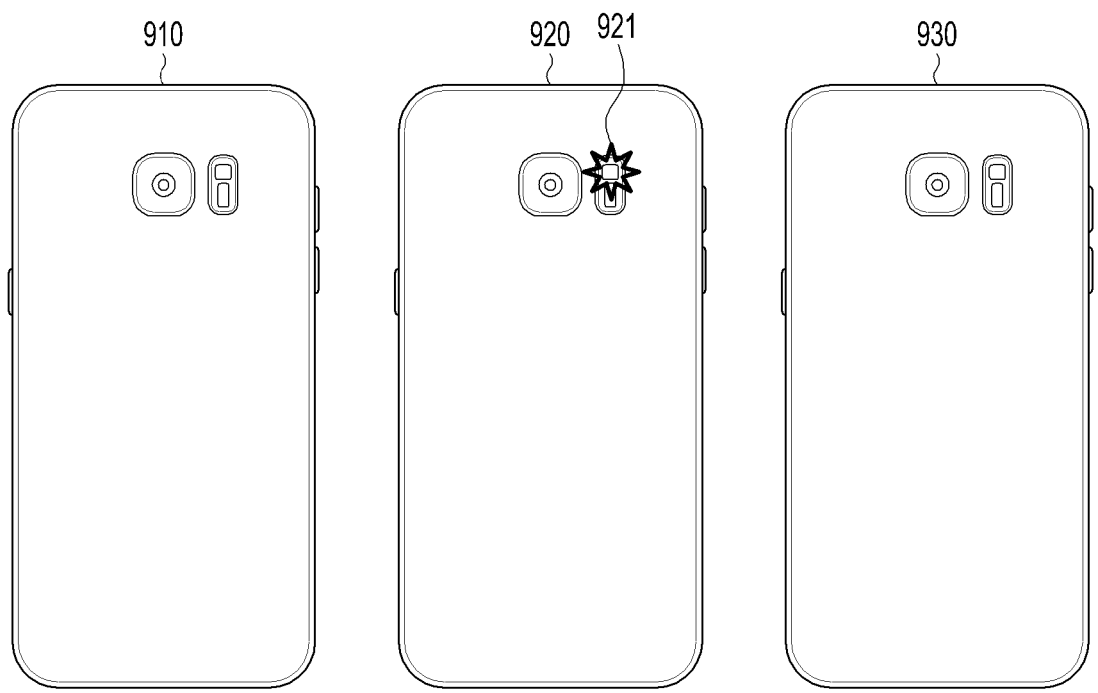
FIG. 9 is a view illustrating a change in capturing speed in an electronic device, according to an embodiment of the present disclosure.
Figure 10:
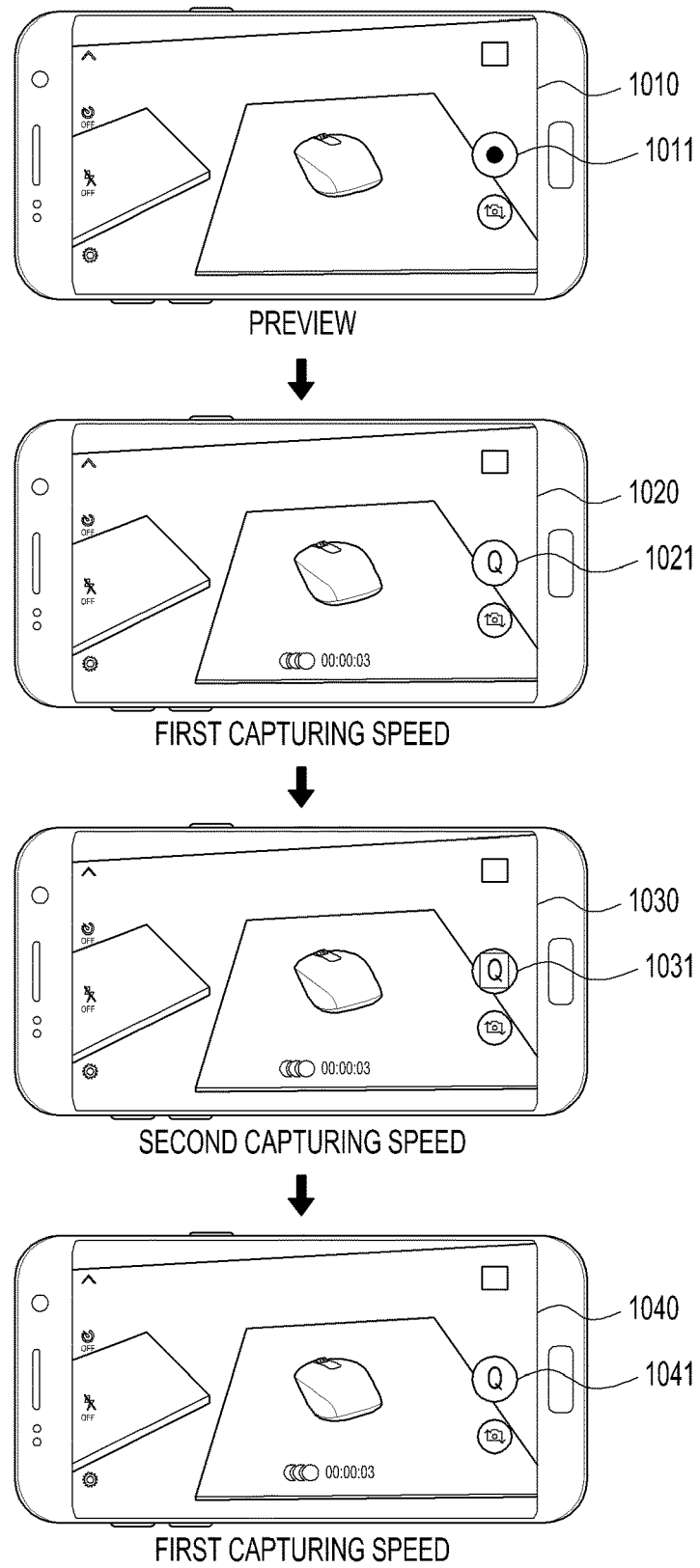
FIG. 10 is a view illustrating a change in capturing speed in an electronic device, according to an embodiment of the present disclosure.

FIGS. 9 and 10 are views illustrating a change in capturing speed in an electronic device, according to an embodiment of the present disclosure.

Referring to FIG. 9, an electronic device may perform the operations for predicting or identifying the change of capturing speed to the low-speed capturing state without outputting notification information when an image capturing device captures (910 and 930) the video during the first capturing period and third capturing period. In contrast, where the image capturing device high-speed captures (920) the video during the second capturing period, the change of capturing speed is predicted or identified as being changed, and the electronic device may output notification information as light 921 through the camera light at the second time.

Referring to FIG. 10, an electronic device, upon capturing one video, may display, on the display, a preview 1010 and visual depictions (e.g., icons) 1011, 1021, 1031, and 1041 to distinguish captures 1020 and 1040 at the first capturing speed from a capture 1030 at the second capturing speed. The electronic device may display an icon 1031 for outputting notification information by giving a different visual effect to an icon 1021 displayed while obtaining the first image at the first capturing speed at, before, or after the time when the second capturing speed changes.

According to an embodiment of the present disclosure, a method for capturing an image in an electronic device may comprise obtaining a first portion of a video at a first capturing speed during a first period using an image capturing device of the electronic device, controlling a first notification to indicate obtaining a second portion of the video at a set second capturing speed when the second capturing speed is set as a speed of capturing the video based on a result of analyzing the first portion obtained, and obtaining the second portion at the second capturing speed during a second period following the first period using the image capturing device.

The method may further comprise setting the second capturing speed of the video based on the result of analyzing the first portion obtained and controlling the image capturing device to change the capturing speed of the video to the set second capturing speed.

The method may further comprise when obtaining the second portion is complete, controlling the image capturing device to change the capturing speed from the second capturing speed to the first capturing speed, performing a second notification to indicate obtaining a third portion of the video at the first capturing speed, and obtaining the third portion at the first capturing speed during a third period following the second period using the image capturing device.

The method may further comprise controlling the first notification to indicate obtaining the second portion of the video at the set second capturing speed may include identifying a variation in motion of an object detected through object detection by performing autofocusing and image analysis on the first portion captured at the first capturing speed and when the identified variation in motion is a preset threshold or more, changing the capturing speed to the second capturing speed and performing the first notification.

The method may further comprise controlling the first notification to indicate obtaining the second portion of the video at the set second capturing speed may include setting a first time when the capturing speed of the video changes to the second capturing speed and a second time for performing the first notification before the second period, changing the first capturing speed to the second capturing speed at the first time in the second period, and performing the first notification at the second capturing speed after the second time in the second period.

The method may further comprise controlling the first notification to indicate obtaining the second portion of the video at the set second capturing speed may include outputting first notification information about the first notification to indicate obtaining the second portion at the second time, and when the first time arrives, outputting second notification information about the first notification to indicate obtaining the second portion continuously during the second period or for a preset time.

The second portion may include part of the first portion obtained a predetermined time before the first time and part of the third portion of the video obtained a predetermined time after the third time to terminate the second capturing speed, and the second portion may be a high-capturing portion of the video.

The method may further comprise identifying a variation in the second capturing speed based on at least one of a state of a register of the image capturing device, a frame output speed of the image capturing device, or a control signal output through an output line (PIN) of the image capturing device.

Figure 11:
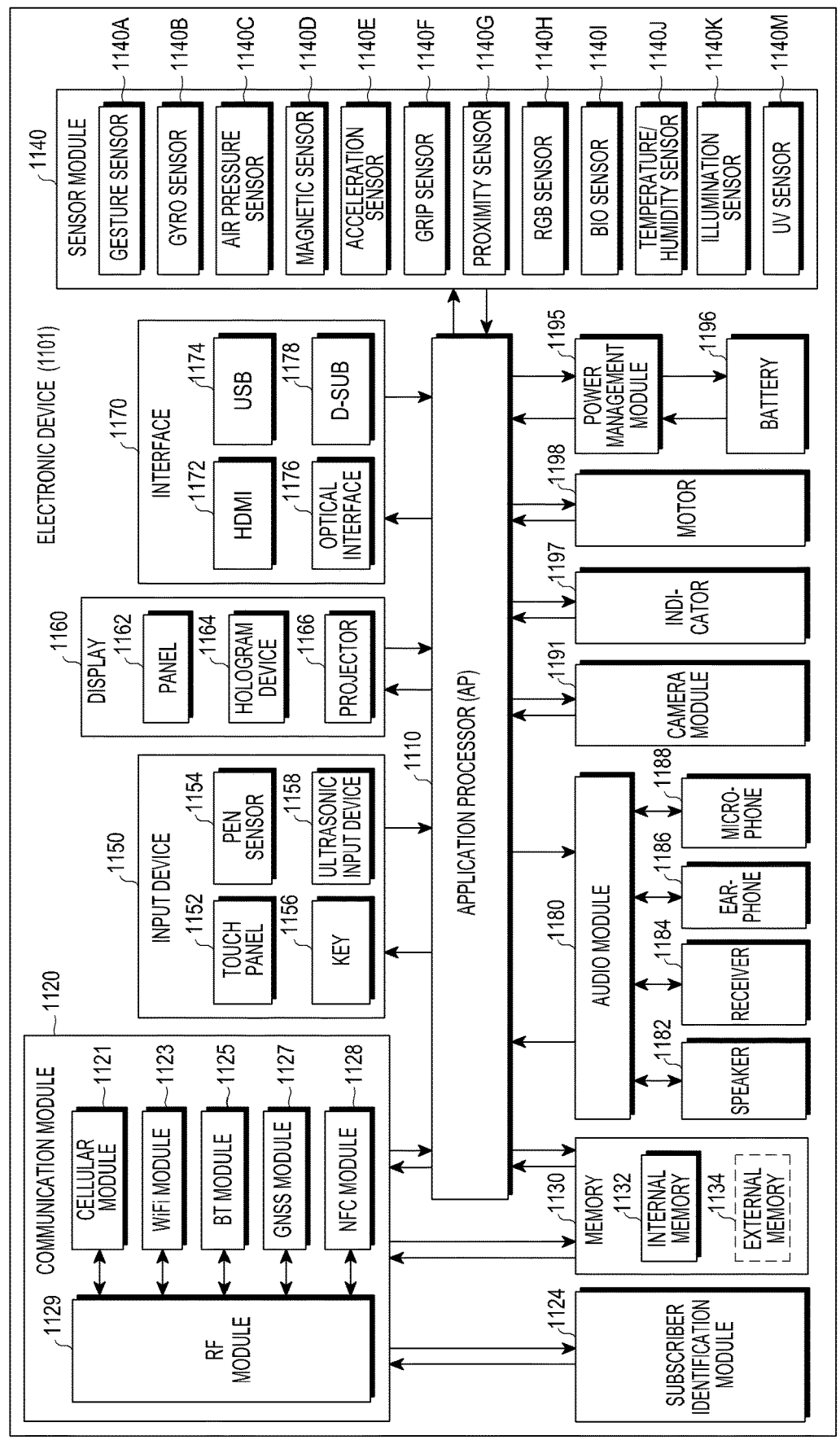
FIG. 11 is a block diagram illustrating an electronic device, according to an embodiment of the present disclosure.

FIG. 11 is a block diagram illustrating an electronic device, according to an embodiment of the present disclosure.

An electronic device 1101 may include the whole or part of the electronic device 101 of FIG. 1. The electronic device 1101 includes one or more processors (e.g., APs) 1110, a communication module 1120, a subscriber identification module (SIM) 1124, a memory 1130, a sensor module 1140, an input device 1150, a display 1160, an interface 1170, an audio module 1180, a camera module 1191, a power management module 1195, a battery 1196, an indicator 1197, and a motor 1198. The processor 1110 may control multiple hardware and software components connected to the processor 1110 by running an OS or application programs, and the processor 210 may process and compute various data. The processor 1110 may be implemented in a system on chip (SoC). The processor 1110 may further include a graphic processing unit (GPU) and/or an image signal processor. The processor 1110 may include at least some (e.g., a cellular module 1121) of the components shown in FIG. 11. The processor 1110 may load a command or data received from at least one of other components (e.g., a non-volatile memory) on a volatile memory, process the command or data, and store the resultant data in the non-volatile memory.

The communication module 1120 may have the same or similar configuration to the communication interface 170. The communication module 1120 may include, e.g., the cellular module 1121, a wireless fidelity (Wi-Fi) module 1123, a bluetooth (BT) module 1125, a GNSS module 1127, a NFC module 1128, and a RF module 1129. The cellular module 1121 may provide voice call, video call, text, or Internet services through a communication network. According to an embodiment of the present disclosure, the cellular module 1121 may perform identification or authentication on the electronic device 1101 in the communication network using a SIM 1124 (e.g., a SIM card). The cellular module 1121 may perform at least some of the functions providable by the processor 1110.

The cellular module 1121 may include a CP. At least some (e.g., two or more) of the cellular module 1121, the Wi-Fi module 1123, the bluetooth module 1125, the GNSS module 1127, or the NFC module 1128 may be included in a single integrated circuit (IC) or an IC package. The RF module 1129 may transmit and receive communication signals (e.g., radio frequency (RF) signals). The RF module 1129 may include a transceiver, a power amp module (PAM), a frequency filter, a low noise amplifier (LNA), or an antenna. At least one of the cellular module 1121, the Wi-Fi module 1123, the bluetooth module 1125, the GNSS module 1127, or the NFC module 1128 may communicate RF signals through a separate RF module. The SIM 1124 may include a SIM card or an embedded SIM, and may contain unique identification information (e.g., an integrated circuit card identifier (ICCID) or subscriber information (e.g., an international mobile subscriber identity (IMSI)). The memory 1130 may include an internal memory 1132 or an external memory 1134. The internal memory 1132 may include at least one of a volatile memory (e.g., a dynamic RAM (DRAM), a static RAM (SRAM), or a synchronous dynamic RAM (SDRAM)) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or a solid state drive (SSD)). The external memory 1134 may include a flash drive (e.g., a compact flash (CF) memory, a SD memory, a micro-SD memory, a min-SD memory, an xD memory, a multi-media card (MMC), or a Memory Stick™). The external memory 1134 may be functionally or physically connected with the electronic device 1101 via various interfaces.

The sensor module 1140 may measure a physical quantity or detect a motion state of the electronic device 1101, and the sensor module 240 may convert the measured or detected information into an electrical signal. The sensor module 1140 may include at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (e.g., a red, green, blue (RGB) sensor), a bio sensor 1140I, a temperature/humidity sensor 1140J, an illumination sensor 1140K, or an ultra violet (UV) sensor 1140M. Additionally or alternatively, the sensing module 1140 may include an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1140 may further include a control circuit for controlling at least one or more of the sensors included in the sensing module.

According to an embodiment of the present disclosure, the electronic device 1101 may further include a processor 1110 configured to control the sensor module 1140 as part of the processor 1110 or separately from the processor 1110, and the electronic device 1101 may control the sensor module 1140 while the processor 1110 is in a sleep mode.

The input unit 1150 may include a touch panel 1152, a digital pen sensor 1154, a key 1156, or an ultrasonic input device 1158. The touch panel 1152 may use at least one of capacitive, resistive, infrared, or ultrasonic methods. The touch panel 1152 may further include a control circuit and a tactile layer to provide an immediate reaction to the user. The digital pen sensor 1154 may include a part of the touch panel or a separate sheet for recognition. The key 1156 may include a physical button, an optical key or a key pad. The ultrasonic input device 1158 may sense an ultrasonic wave generated from an input tool through a microphone 1188 to identify data corresponding to the sensed ultrasonic wave.

The display 1160 may include a panel 1162, a hologram device 1164, a projector 1166, and/or a control circuit for controlling the same. The panel 1162 may be implemented to be flexible, transparent, or wearable. The panel 1162, together with the touch panel 1152, may be configured in one or more modules. The panel 1162 may include a pressure sensor that may measure the strength of a pressure by the user's touch. The pressure sensor may be implemented in a single body with the touch panel 1152 or may be implemented in one or more sensors separate from the touch panel 1152. The hologram device 1164 may make 3D images (holograms) in the air by using light interference. The projector 1166 may display an image by projecting light onto a screen. The screen may be located inside or outside of the electronic device 1101. The interface 1170 may include an HDMI 1172, a USB 1174, an optical interface 1176, or a D-subminiature (D-sub) 1178. The interface 1170 may be included in the communication interface 170 shown in FIG. 1. Additionally or alternatively, the interface 1170 may include a mobile high-definition link (MHL) interface, SD card/MMC interface, or Infrared Data Association (IrDA) interface.

The audio module 1180 may convert a sound signal into an electrical signal and vice versa. At least a part of the audio module 1180 may be included in the input/output interface 145 as shown in FIG. 1. The audio module 1180 may process sound information input or output through a speaker 1182, a receiver 1184, an earphone 1186, or the microphone 1188. For example, the camera module 1191 (i.e., the image capturing device 220 of FIG. 2 or the electronic device 300 of FIG. 3) may be a device for capturing still images and videos, and may include one or more image sensors (e.g., front and back sensors), a lens, an image signal processor (ISP), or a flash such as an LED or xenon lamp. The power manager module 1195 may manage power of the electronic device 1101.

The power manager module 1195 may include a power management IC (PMIC), a charger IC, or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, or a rectifier, may be added for wireless charging. The battery gauge may measure an amount of remaining power of the battery 1196, a voltage, a current, or a temperature. The battery 1196 may include a rechargeable battery and/or a solar battery.

The indicator 1197 may indicate a particular state of the electronic device 1101 or a part (e.g., the processor 1110) of the electronic device, including a booting state, a message state, or a recharging state. The motor 1198 may convert an electric signal to a mechanical vibration and may generate a vibrational or haptic effect. The electronic device 1101 may include a mobile TV supporting device (e.g., a GPU) that may process media data according to digital multimedia broadcasting (DMB), digital video broadcasting (DVB), or mediaFlo™ standards.

Each of the aforementioned components of the electronic device may include one or more parts, and a name of the part may vary with a type of the electronic device. According to various embodiments of the present disclosure, the electronic device 1101 may exclude some elements or include more elements, or some of the elements may be combined into a single entity that may perform the same function as or by the elements before combined.

Figure 12:
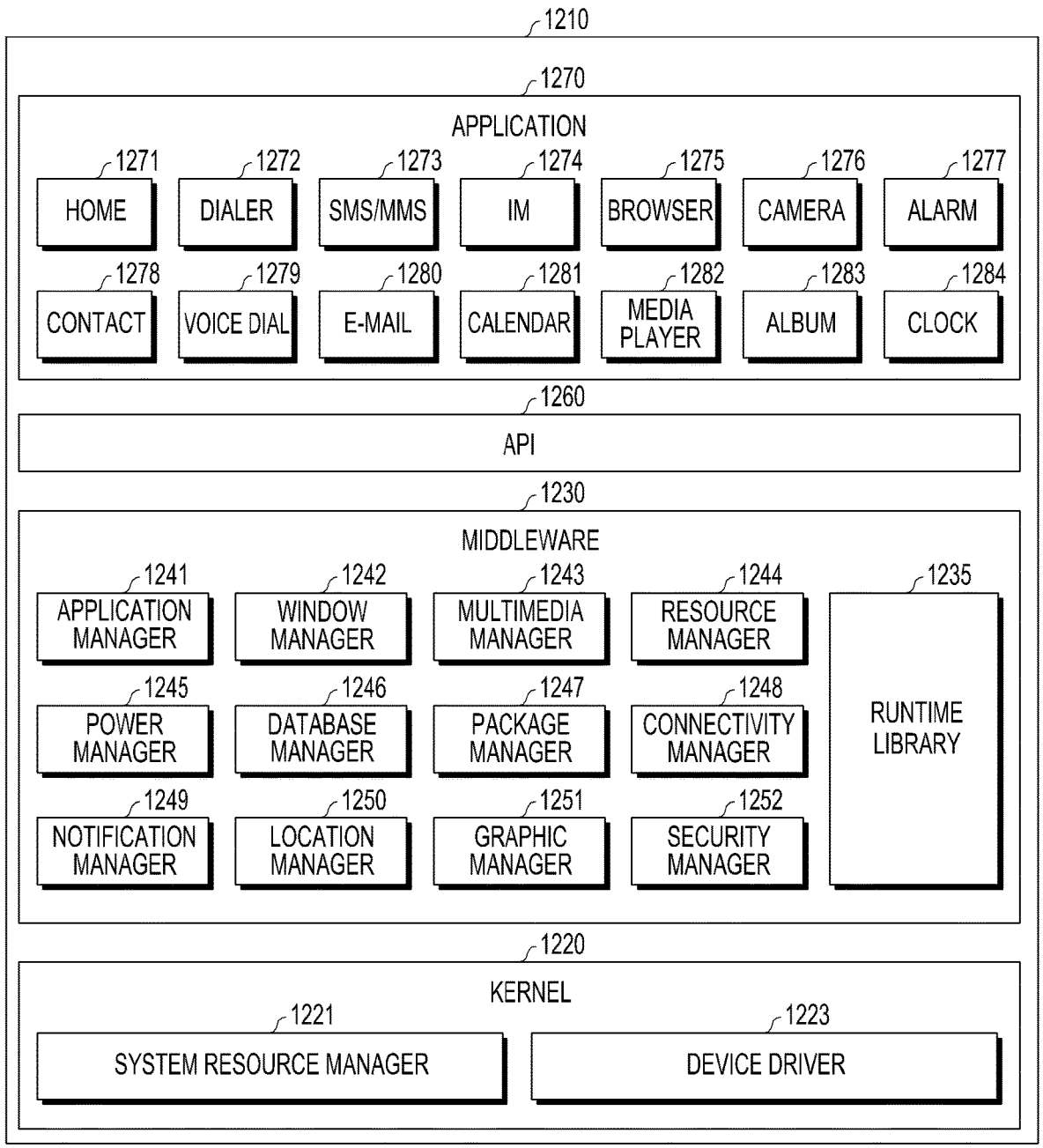
FIG. 12 is a block diagram illustrating a program module, according to an embodiment of the present disclosure.

FIG. 12 is a block diagram illustrating a program module, according to an embodiment of the present disclosure.

The program module 1210 may include an OS controlling resources related to the electronic device 101 and/or various applications 147 driven on the OS. The operating system may include Android™, iOS™, Windows™, Symbian™, Tizen™, or Bada™.

The program module 1210 includes a kernel 1220, middleware 1230, an API 1260, and/or an application 1270. At least a part of the program module 1210 may be preloaded on the electronic device or may be downloaded from an external electronic device.

The kernel 1220 includes a system resource manager 1221 or a device driver 1223. The system resource manager 1221 may perform control, allocation, or recovery of system resources. The system resource manager 1221 may include a process managing unit, a memory managing unit, or a file system managing unit. The device driver 1223 may include a display driver, a camera driver, a bluetooth driver, a shared memory driver, a USB driver, a keypad driver, a Wi-Fi driver, an audio driver, or an inter-process communication (IPC) driver. The middleware 1230 may provide various functions to the application 1270 through the API 1260 so that the application 1270 may use limited system resources in the electronic device or provide functions jointly required by applications 1270. The middleware 1230 includes at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, or a security manager 1252.

The runtime library 1235 may include a library module used by a compiler in order to add a new function through a programming language while the application 1270 is being executed. The runtime library 1235 may perform input/output management, memory management, or arithmetic function processing. The application manager 1241 may manage the life cycle of the applications 1270. The window manager 1242 may manage GUI resources used on the screen. The multimedia manager 1243 may grasp formats necessary to play media files and use an appropriate codec to perform encoding or decoding on media files. The resource manager 1244 may manage the source code or memory space of the application 1270. The power manager 1245 may manage the battery capability, or power, and provide power information necessary for the operation of the electronic device. The power manager 1245 may interwork with a basic input/output system (BIOS). The database manager 1246 may generate, search, or vary a database to be used in the applications 1270. The package manager 1247 may manage an installation or update of an application that is distributed in the form of a package file.

The connectivity manager 1248 may manage wireless connectivity. The notification manager 1249 may provide an event arrival message, appointment, or proximity alert, to the user. The location manager 1250 may manage locational information on the electronic device. The graphic manager 1251 may manage graphic effects to be offered to the user and their related user interface. The security manager 1252 may provide system security or user authentication. The middleware 1230 may include a telephony manager for managing the voice or video call function of the electronic device or a middleware module able to form a combination of the functions of the above-described elements. The middleware 1230 may provide a module specified according to the type of OS. The middleware 1230 may dynamically omit some existing components or add new components. The API 1260 may be a set of API programming functions and may have different configurations depending on OS's. For example, in the case of Android™ or iOS™, one API set may be provided per platform, and in the case of Tizen™, two or more API sets may be offered per platform.

The application 1270 may include a home 1271 application, a dialer 1272 application, an SMS/MMS 1273 application, an instant message (IM) 1274 application, a browser 1275 application, a camera 1276 application, an alarm 1277 application, a contact 1278 application, a voice dial 1279 application, an email 1280 application, a calendar 1281 application, a media player 1282 application, an album 1283 application, or a clock 1284 application, a heath-care (e.g., measuring the degree of a workout or a user's bloodsugar) application, or environmental information (e.g., air pressure, moisture, or temperature information). The application 1270 may include an information exchanging application supporting information exchange between the electronic device and an external electronic device. Examples of the information exchange application may include, but are not limited to, a notification relay application for transferring specific information to the external electronic device, or a device management application for managing the external electronic device.

The notification relay application may transfer notification information generated by other application of the electronic device to the external electronic device or receive notification information from the external electronic device and provide the received notification information to the user. For example, the device management application may install, delete, or update a function (e.g., turn-on/turn-off one or more elements of the external electronic device or adjust the brightness (or resolution) of the display) of the external electronic device communicating with the electronic device or an application operating on the external electronic device. The application 1270 may include an application (e.g., a health-care application of a mobile medical device) designated according to an attribute of the external electronic device. The application 1270 may include an application received from the external electronic device. At least a portion of the program module 1210 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms "logic," "logic block," "part," or "circuit." The module may be a single integral part or a minimum unit or part of performing one or more functions. The module may be implemented mechanically or electronically and may include an application-specific integrated circuit (ASIC) chip, a field-programmable gate array (FPGA), or programmable logic device, that has been known or to be developed in the future. At least a part of the device (e.g., modules or their functions) or method (e.g., operations) may be implemented as instructions stored in a computer-readable storage medium (e.g., the memory 140) in the form of a program module. The instructions, when executed by a processor (e.g., the processor 130), may enable the processor to carry out a corresponding function. The computer-readable medium may include a hard disk, a floppy disc, a magnetic medium (e.g., a magnetic tape), an optical recording medium (e.g., a compact disc-read only memory (CD-ROM), a DVD, or a magnetic-optical medium (e.g., a floptical disk)), or an embedded memory. The instruction may include code created by a compiler or code executable by an interpreter. Modules or programming modules may include at least one or more of the aforementioned components, omit some of them, or further include additional components. Operations performed by modules, programming modules or other components may be carried out sequentially, in parallel, repeatedly or heuristically, or at least some operations may be executed in a different order, omitted, or other operations may be added.

According to an embodiment of the present disclosure, there is provided a computer readable recording medium recording a program running on a computer, the program including executable commands executed by a processor to enable the processor to obtain a first portion of a video at a first capturing speed during a first period using an image capturing device of the electronic device, control a first notification to indicate obtaining a second portion of the video at a set second capturing speed when the second capturing speed is set as a speed of capturing the video based on a result of analyze the first portion obtained, and obtain the second portion at the second capturing speed during a second period following the first period using the image capturing device.

The electronic device, and method for providing information from the electronic device, may change the capturing speed to the second capturing speed which is a high capturing speed based on a variation in motion of the object analyzed from the first image captured at the first image captured at the first capturing speed, enabling obtaining the second image by high-speed capturing during a particular period subsequent to obtaining the first image. Thus, only a material part of one video may be captured at high speed, while the rest is captured at a low speed. By so doing, the volume of video and power consumption of image processing may be reduced.

The electronic device may obtain a high-speed video at the timing the user intended by notifying the user of the change to the second capturing speed. The user may intuitively identify when high-speed capturing is performed while capturing a video.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. An electronic device, comprising:
an image capturing device; and
a processor electrically connected with the image capturing device,
wherein the processor is configured to:
obtain a first portion of a video at a first capturing speed during a first period using the image capturing device;
set a first time and a second time based on the first portion before a start of a second period following the first period, wherein the first time is a time for changing a speed of capturing the video to a second capturing speed, and wherein the second time is a time for notifying before the second period that a second portion of the video is to be obtained at the second capturing speed;
output, at the second time before changing the speed of capturing the video from the first capturing speed to the second capturing speed, first notification information to a user of the image capturing device while obtaining the first portion of the video at the first capturing speed, wherein the first notification information is information notifying that the second portion of the video is to be obtained at the second capturing speed;
change, at the first time before the second period starts, the speed of capturing the video from the first capturing speed to the second capturing speed and output, at the first time, second notification information notifying that the speed of capturing the video is changed to the second capturing speed; and
obtain the second portion of the video at the second capturing speed during the second period using the image capturing device,
wherein the second time is within the first period and earlier than the first time, and
wherein each of the first notification information and the second notification information is output using at least one of a light, a sound, a vibration, or a visual effect of a display.

2. The electronic device of claim 1, wherein the processor is further configured to, when obtaining the second portion is complete, control the image capturing device to change the capturing speed from the second capturing speed to the first capturing speed, perform a second notification for notifying before a third period that a third portion of the video is to be obtained at the first capturing speed, and obtain the third portion at the first capturing speed during the third period following the second period using the image capturing device.

3. The electronic device of claim 1, wherein the processor is further configured to detect an object from the first portion based on the result of analyzing the first portion captured at the first capturing speed, identify a variation in motion of the detected object, and when the identified variation in motion is a preset threshold or more, set the first time and the second time.

4. The electronic device of claim 1, wherein the second notification information is outputted continuously for a preset time to notify that the second portion is obtained.

5. The electronic device of claim 1, wherein the image capturing device comprises a pixel array including a plurality of pixels, a read-out circuit receiving an analog signal from each of the plurality of pixels, converting the analog signal into a digital signal, and outputting the digital signal, and a register temporarily storing the digital signal output from the read-out circuit.

6. The electronic device of claim 5, wherein the image capturing device comprises a control circuit controlling the pixel array to output the analog signal and change the capturing speed of the video and an image processing circuit detecting an object included in the first portion output at the first capturing speed and identifying variation in motion of the detected object.

7. The electronic device of claim 1, wherein the processor comprises a control circuit controlling a pixel array of the image capturing device to change the capturing speed of the video, and
wherein the first notification information is output using at least one of a light, a sound, a vibration, or a visual effect of the display.

8. The electronic device of claim 1, wherein the processor is further configured to identify a variation in the capturing speed of the video based on at least one of a state of a register of the image capturing device, a frame output speed of the image capturing device, or a control signal output through an output line of the image capturing device.

9. The electronic device of claim 1, wherein the processor is further configured to set the second capturing speed as the capturing speed of the video based on variations in pixel values of images of the first obtained portion.

10. A method for capturing an image in an electronic device, the method comprising:
obtaining a first portion of a video at a first capturing speed during a first period using an image capturing device of the electronic device;
setting a first time and a second time based on the first portion before a start of a second period following the first period, wherein the first time is a time for changing a speed of capturing the video to a second capturing speed, and wherein the second time is a time for notifying before the second period that a second portion of the video is to be obtained at the second capturing speed;
outputting, at the second time before changing the speed of capturing the video from the first capturing speed to the second capturing speed, first notification information to a user of the image capturing device while obtaining the first portion of the video at the first capturing speed, wherein the first notification information is information notifying that the second portion of the video is to be obtained at a second capturing speed;
changing, at the first time before the second period starts, the speed of capturing the video from the first capturing speed to the second capturing speed and outputting, at the first time, second notification information notifying that the speed of capturing the video is changed to the second capturing speed; and
obtaining the second portion of the video at the second capturing speed during the second period using the image capturing device,
wherein the second time is within the first period and earlier than the first time, and
wherein each of the first notification information and the second notification information is output using at least one of a light, a sound, a vibration, or a visual effect of the display.

11. The method of claim 10, further comprising:
when obtaining the second portion is complete, controlling the image capturing device to change the capturing speed from the second capturing speed to the first capturing speed;
performing a second notification for notifying before a third period that a third portion of the video is to be obtained at the first capturing speed; and
obtaining the third portion at the first capturing speed during the third period following the second period using the image capturing device.

12. The method of claim 11, wherein setting the first time and the second time comprises:
identifying a variation in motion of an object detected through object detection by performing autofocusing and image analysis on the first portion captured at the first capturing speed, and
when the identified variation in motion is a preset threshold or more, setting the first time and the second time.

13. The method of claim 10, further comprising:
outputting the second notification information notifying that the speed of capturing the video is to be changed to the second capturing speed, and wherein the second notification information is output continuously for a preset time to notify that the second portion is obtained.

14. The method of claim 10, further comprising identifying a variation in the second capturing speed based on at least one of a state of a register of the image capturing device, a frame output speed of the image capturing device, or a control signal output through an output line of the image capturing device.

15. A non-transitory computer readable recording medium recording a program running on a computer, the program including executable commands executed by a processor to enable the processor to:
obtain a first portion of a video at a first capturing speed during a first period using an image capturing device of the electronic device,
set a first time and a second time based on the first portion before a start of a second period following the first period, wherein the first time is a time for changing a speed of capturing the video to the second capturing speed, and wherein the second time is a time for notifying before a second period that a second portion of the video is to be obtained at the second capturing speed;
output, at the second time before changing the speed of capturing the video from the first capturing speed to the second capturing speed, first notification information to a user of the image capturing device while obtaining the first portion of the video at the first capturing speed, wherein the first notification information is information notifying that the second portion of the video is to be obtained at the second capturing speed;
change, at the first time before the second period starts, the speed of capturing the video from the first capturing speed to the second capturing speed and output, at the first time, second notification information notifying that the speed of capturing the video is changed to the second capturing speed; and obtain the second portion of the video at the second capturing speed during the second period using the image capturing device, wherein the second time is within the first period and earlier than the first time, and wherein each of the first notification information and the second notification information is output using at least one of a light, a sound, a vibration, or a visual effect of the display.

* * * * *